United States Patent
Layosh

(10) Patent No.: US 11,852,843 B1
(45) Date of Patent: Dec. 26, 2023

(54) DIFFRACTIVE OPTICAL ELEMENTS (DOES) FOR HIGH TOLERANCE OF STRUCTURED LIGHT

(71) Applicant: Meta Platforms Technologies, LLC, Menlo Park, CA (US)

(72) Inventor: Yaakov Yonatan Layosh, Palo Alto, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 1020 days.

(21) Appl. No.: 16/735,897

(22) Filed: Jan. 7, 2020

Related U.S. Application Data

(63) Continuation-in-part of application No. 15/867,463, filed on Jan. 10, 2018, now Pat. No. 10,895,752.

(51) Int. Cl.
*G02B 27/42* (2006.01)

(52) U.S. Cl.
CPC .................................. *G02B 27/425* (2013.01)

(58) Field of Classification Search
CPC ............ G02B 27/0944; G02B 27/4205; G02B 27/4233; G02B 27/425; G02B 27/4266; G02B 27/4272; G02B 27/4277; G02B 27/48; G02B 27/09; G02B 27/42; G02B 19/0057; G02B 27/0037; G02B 27/0905; G02B 27/20; G03B 35/00; G01B 11/2513; G01B 11/25; G01B 11/167; G01B 2210/146; G06T 7/521

See application file for complete search history.

(56) References Cited

U.S. PATENT DOCUMENTS

| | | | |
|---|---|---|---|
| 5,621,527 A | 4/1997 | Kaneda et al. |
| 6,072,631 A | 6/2000 | Guenther et al. |
| 7,675,629 B2 | 3/2010 | Ohsaki et al. |
| 9,686,839 B1 | 6/2017 | Chern et al. |
| 9,915,827 B2 | 3/2018 | Gordon |
| 2003/0067685 A1 | 4/2003 | Niv |

(Continued)

OTHER PUBLICATIONS

United States Office Action, U.S. Appl. No. 15/867,463, dated Apr. 9, 2020, 14 pages.

*Primary Examiner* — Balram T Parbadia
(74) *Attorney, Agent, or Firm* — Fenwick & West LLP

(57) ABSTRACT

Disclosed herein are techniques for structured light pattern generation. A method for generating a one-dimensional structured light pattern in a first direction and with a desired intensity pattern includes generating a plurality of one-dimensional light patterns using a two-dimensional diffractive optical element with different periods in two orthogonal directions, and combining the plurality of one-dimensional light patterns to form the one-dimensional structured light pattern with the desired intensity pattern. Each of the one-dimensional light patterns includes a one-dimensional light pattern in the first direction. The plurality of one-dimensional light patterns is distributed in a second direction different from the first direction. A separation angle between each pair of adjacent one-dimensional light patterns of the plurality of one-dimensional light patterns in the second direction and with respect to the two-dimensional diffractive optical element is less than a threshold value.

20 Claims, 17 Drawing Sheets

(56) References Cited

U.S. PATENT DOCUMENTS

| | | | |
|---|---|---|---|
| 2004/0101168 A1* | 5/2004 | Kostrzewski | G06V 10/895 |
| | | | 708/816 |
| 2012/0050713 A1 | 3/2012 | Inoue | |
| 2012/0105855 A1 | 5/2012 | Miyasaka et al. | |
| 2012/0236288 A1 | 9/2012 | Stanley | |
| 2013/0038941 A1 | 2/2013 | Pesach et al. | |
| 2013/0182327 A1 | 7/2013 | Miyasaka et al. | |
| 2014/0211215 A1 | 7/2014 | Pesach et al. | |
| 2015/0338676 A1* | 11/2015 | Cayer | G02B 27/46 |
| | | | 356/610 |
| 2016/0371845 A1* | 12/2016 | Yasovsky | G02B 27/4205 |
| 2016/0377414 A1 | 12/2016 | Thuries et al. | |
| 2017/0115497 A1 | 4/2017 | Chen et al. | |
| 2017/0188016 A1 | 6/2017 | Hudman et al. | |
| 2018/0038685 A1 | 2/2018 | Torri et al. | |

* cited by examiner

DIFFRACTIVE OPTICAL ELEMENTS (DOES) FOR HIGH TOLERANCE OF STRUCTURED LIGHT

CROSS REFERENCE TO RELATED APPLICATIONS

This application is a continuation in part of U.S. patent application Ser. No. 15/867,463, filed on Jan. 10, 2018, the contents of which are incorporated herein by reference in its entirety.

BACKGROUND

Structured lighting is the process of projecting a desired illumination pattern (e.g., spots, stripes, grids, etc.) for applications such as scanning, sensing, gaming, and surface inspection. It is generally desirable to generate the illumination pattern with a known or desired intensity profile, such that the intensity of the returned light may indicate, for example, the characteristics of the surface and/or the relative distance (or depth) of a target object or scene being scanned.

Diffractive optical elements (DOEs) with periodic optical structures may be used to generate the desired illumination pattern. DOEs with arbitrary phase profiles for generating the desired illumination pattern with the desired intensity pattern (or profile) may be fabricated with various mature techniques, such as a semiconductor fabrication process or molding process. However, due to the small feature size of the periodic optical structures for optical diffraction, manufacturing process variations or defects and/or design approximations may cause a relatively large difference between the desired intensity profile and the actual intensity profile of the illumination pattern generated by the fabricated DOE.

SUMMARY

The present disclosure generally relates to systems and methods for generating a structured light pattern with a desired intensity profile. The systems and methods disclosed herein have high tolerance to design and manufacturing inaccuracy, such as manufacturing process variations or defects, and/or design approximations or round-off errors. In some embodiments, an optical device comprises a two-dimensional (2D) diffractive optical element including structures with different periods in two orthogonal directions. The 2D diffractive optical element is configured to use light to generate a plurality of one dimensional (1D) light patterns parallel to a first direction. The plurality of 1D light patterns are compressed in a second direction that is orthogonal to the first direction such that the plurality of 1D light patterns form an aggregate 1D pattern parallel to the first direction that has a zeroth diffraction order with an intensity value below a target threshold.

In some embodiments, a depth camera assembly comprises a light source and a 2D diffractive optical element including structures with different periods in two orthogonal directions. The 2D diffractive optical element is configured to use light from the light source to generate a plurality of 1D light patterns parallel to a first direction. The plurality of 1D light patterns are compressed in a second direction that is orthogonal to the first direction such that the plurality of 1D light patterns form an aggregate 1D pattern parallel to the first direction with a zeroth diffraction order whose intensity value is below a target threshold.

BRIEF DESCRIPTION OF THE DRAWINGS

Illustrative embodiments are described in detail below with reference to the following figures.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

In the following description, for the purposes of explanation, specific details are set forth in order to provide a thorough understanding of examples of the disclosure. However, it will be apparent that various examples may be practiced without these specific details. For example, devices, systems, structures, assemblies, methods, and other components may be shown as components in block diagram form in order not to obscure the examples in unnecessary detail. In other instances, well-known devices, processes, systems, structures, and techniques may be shown without necessary detail in order to avoid obscuring the examples. The figures and description are not intended to be restrictive. The terms and expressions that have been employed in this disclosure are used as terms of description and not of limitation, and there is no intention in the use of such terms and expressions of excluding any equivalents of the features shown and described or portions thereof.

Structured lighting is a method in which a known light pattern is projected onto an object or a scene, and, by measuring the deformed pattern, a vision system can determine depth, movement, etc. The structured light pattern can have various shapes, textures, and periods. Structured lighting techniques can be applied in three-dimensional mapping/sensing, shape measurements, machine/computer vision, etc. For example, a structured light depth sensing system may operate by projecting a one-dimensional or two-dimensional light pattern onto a scene. The depth sensing system may then capture image(s) which may represent the scene as illuminated by the light pattern. The depth sensing system may determine the changes that may have occurred between the original light pattern that is projected onto the scene and the light pattern that appears in the captured image(s). The depth sensing system may then use the changes to determine the depth of surfaces in the scene, for example, using triangulation techniques.

Figure 1:
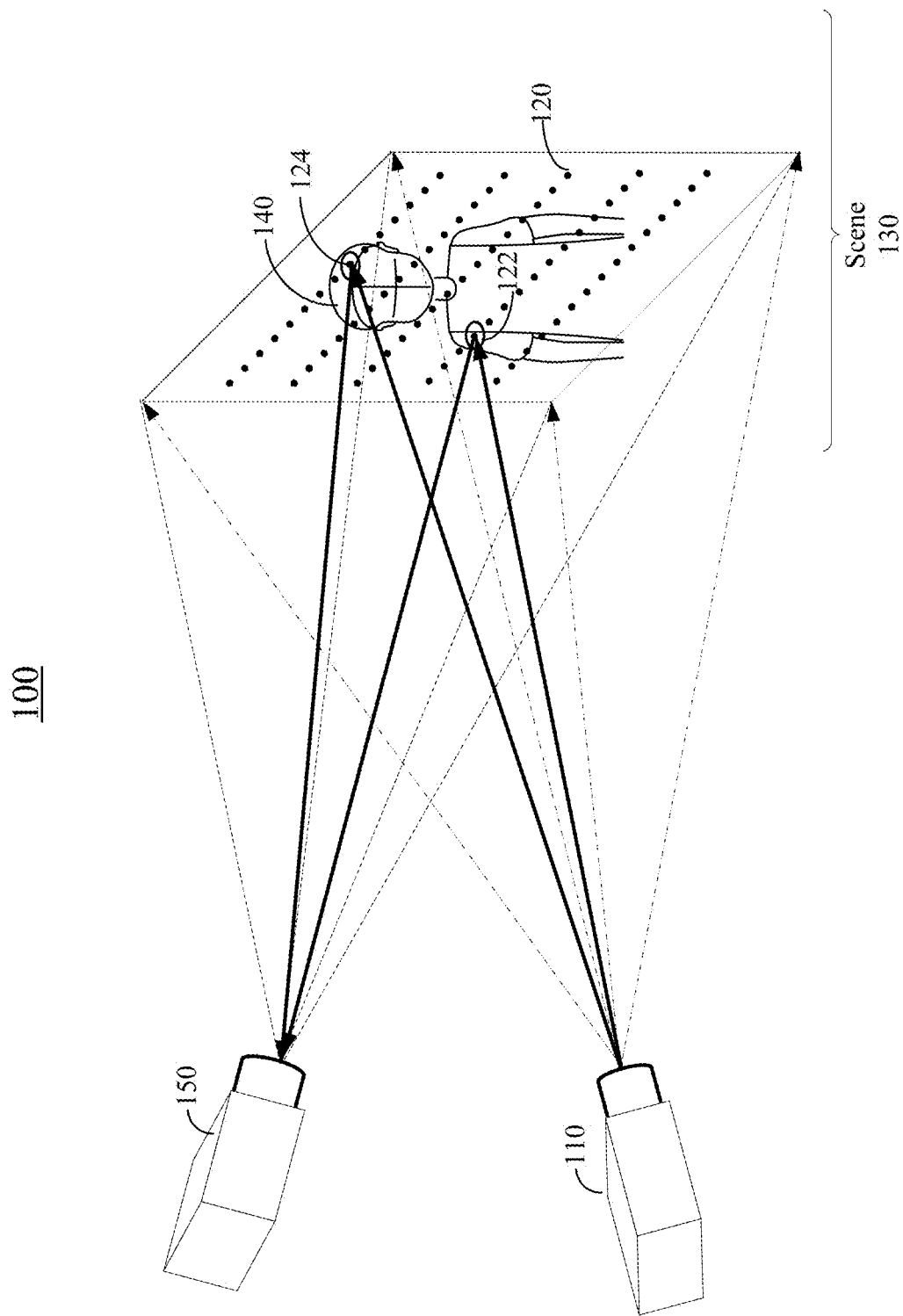
FIG. 1 illustrates an example system for depth sensing using a structured light pattern, according to certain embodiments.

FIG. 1 illustrates an example system 100 for depth sensing using a structured light pattern, according to certain embodiments. System 100 may include a projector 110 and a camera 150. The system 100 may be referred to as a depth camera assembly. Projector 110 may be used to project a structured light pattern 120 onto a scene 130. Projector 110 may include a monochromatic light source (which may be a coherent light source, such as a laser) and optics for collimating the light beam from the light source and for splitting the collimated light beam into multiple light beams to generate the desired light pattern. Camera 150 may be used to capture images from scene 130. The images may represent scene 130 as illuminated by structured light pattern 120. System 100 may then analyze the images and the originally projected structured light pattern 120 to construct a depth map. The depth map may represent the depths of surfaces within scene 130.

For example, in the representative example shown in FIG. 1, the depth map may represent the depths of the surface of a subject 140 within scene 130. The depths may be measured with respect to a reference point, such as the source of the projected pattern (i.e., projector 110). In this representative example, light spot 122 in structured light pattern 120 may illuminate a part of the shoulder of subject 140, which may have a shorter distance to the reference point. Light spot 124 in structured light pattern 120 may illuminate a part of the head of subject 140, which may have a longer distance to the reference point. Because the surface of subject 140 is not flat or a spherical surface centered around projector 110, the originally projected structured light pattern may be distorted differently at different light spots by subject 140 in the captured images. The distortion of the projected structured light pattern may then be used to determine the depths of the surface of subject 140. Examples of structured light patterns generated by the system 100 are shown in FIGS. 2A-7B.

Figure 2A:
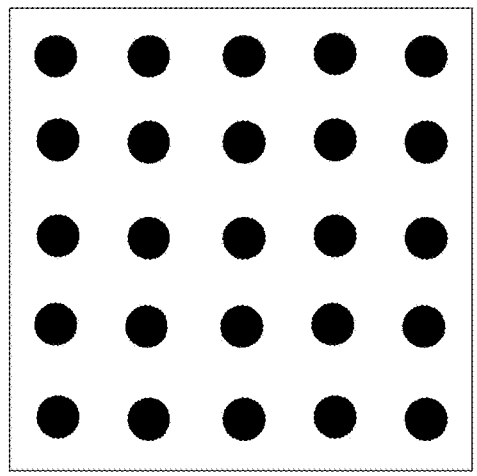
FIG. 2A illustrates an example structured light pattern, according to certain embodiments.
Figure 2B:
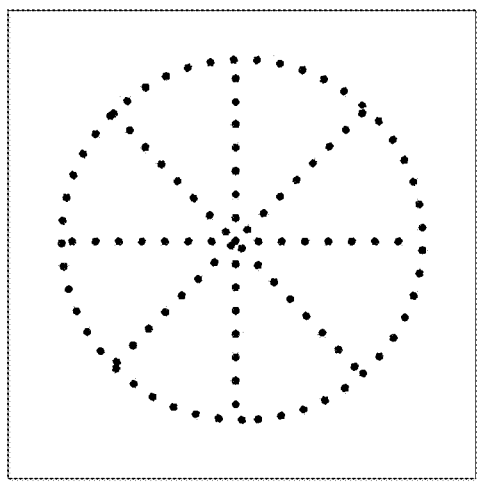
FIG. 2B illustrates an example structured light pattern, according to certain embodiments.
Figure 2C:
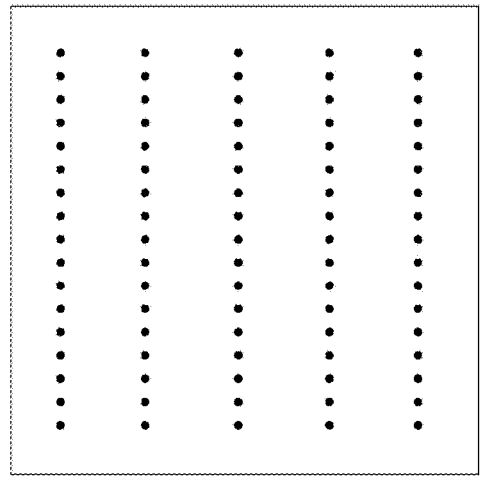
FIG. 2C illustrates an example structured light pattern, according to certain embodiments.
Figure 2D:
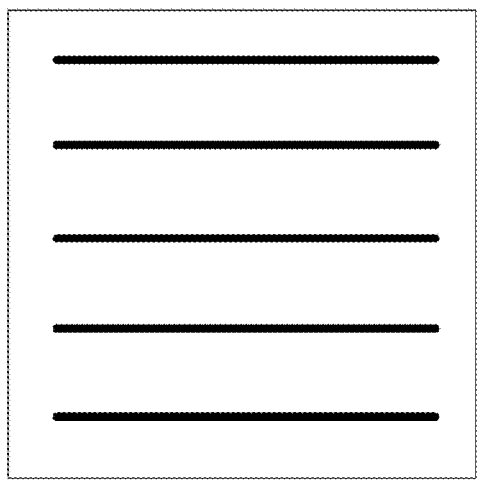
FIG. 2D illustrates an example structured light pattern, according to certain embodiments.
Figure 2E:
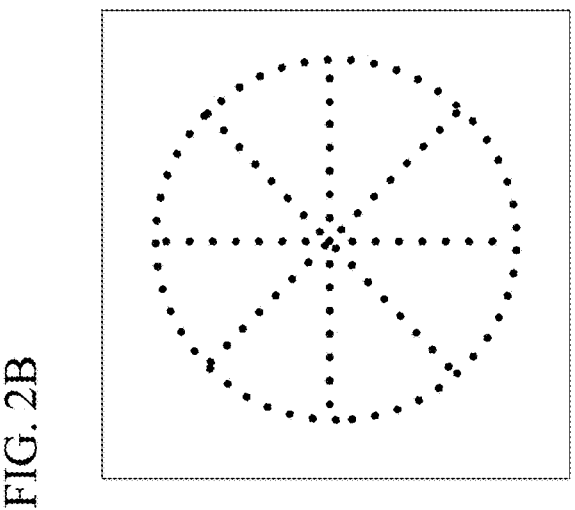
FIG. 2E illustrates an example structured light pattern, according to certain embodiments.

FIGS. 2A-2E illustrate some examples of a structured light pattern, according to certain embodiments. FIG. 2A illustrates an example structured light pattern including a straight line at any desired angle. FIG. 2B illustrates an example structured light pattern including a two-dimensional array of equally spaced light spots (a grid or matrix). FIG. 2C illustrates an example structured light pattern including multiple one-dimensional light patterns, where each one-dimensional light pattern includes a one-dimensional array of light spots. FIG. 2D illustrates an example structured light pattern including multiple one-dimensional light patterns, where each one-dimensional light pattern includes a vertical line. FIG. 2E illustrates an example structured light pattern in the shape of a pie chart.

It is noted that the examples shown in FIGS. 2A-2E are just some representative examples. A structured light pattern may include any desired simple or complex pattern shown or not shown in FIGS. 2A-2E. The structured light patterns may be obtained by using diffractive optical elements (DOEs), such as ruled gratings, holographic gratings, multi-level DOEs (i.e., binary optical elements), micro-optical elements, nano-optical elements, computer-generated holograms, etc. Because the feature sizes of these optical elements are generally comparable to or smaller than the working wavelength of the light source (e.g., any suitable laser source), optical diffraction theory or electromagnetic field theory may be used to design or analyze such optical elements. For example, the overall electrical (or light) field at a spot may be determined by coherently summing electromagnetic waves from each region of the diffractive optical element, where each region of the diffractive optical element may modify the amplitude and/or phase of the electromagnetic wave from the source. An example analysis of a one-dimensional optical grating is provided below to facilitate the understanding of the present disclosure. A person skilled in the art would understand that various complex numerical optimization techniques and commercial computer-aided design software packages (e.g., ZEMAX®) may be used to design and/or analyze a complex diffractive optical element to achieve a desired light pattern.

Figure 3:
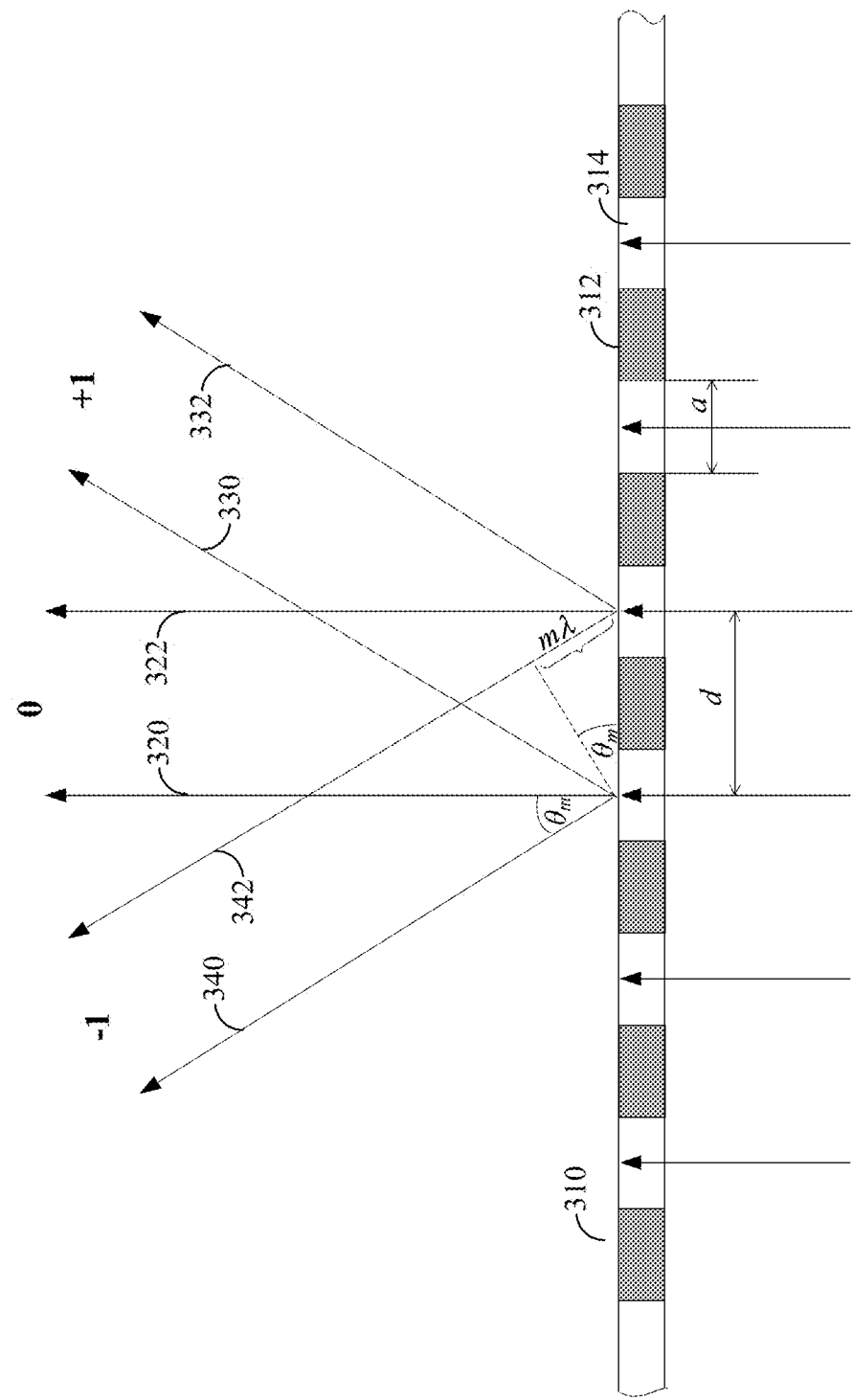
FIG. 3 illustrates example optical diffractions by an example one-dimensional grating.

FIG. 3 illustrates optical diffractions by an example one-dimensional diffraction grating 310. A diffraction grating may include a quasi-one-dimensional structure consisting of a series of parallel slits, notches, lines, steps, etc. (which may be referred to as grating grooves). In the example, one-dimensional optical grating 310 may be a transmission grating with multiple grooves 312, where each groove 312 may have a length d and may include a slit 314 with a width a. According to the Huygens-Fresnel principle, when a plane wave is incident on the grating, each groove 312 (or slit 314) may act like a point source, emitting a spherical wave (or more accurately, a cylindrical wave). The wavefront of the propagating wave at any subsequent point can be found by summing the contributions from each of these individual point sources. For certain angles, there will be a destructive interference. For some other angles, there may be a constructive interference. The peaks of the constructive interference may be referred to as diffraction orders. The diffraction angle $\theta_m$ for the mth diffraction order may be determined by the following grating equation:

$$d \sin \theta_m = m\lambda$$

where $\lambda$ is the wavelength of the incident wave. For example, for zero order diffraction (transmission) represented by lines 320 and 322, the diffraction angle is 0. For the +1th diffraction order represented by lines 330 and 332, the diffraction angle is positive (to the right of the zero order). For the −1th diffraction order represented by lines 340 and 342, the diffraction angle is negative (to the left of the zero order).

It can be seen from the above grating equation that, when the grating period d is smaller, the diffraction angle $\theta_m$ for the same mth diffraction order becomes larger. In other words, when the grating period d is small, the different diffraction orders are widely spread. Conversely, when the grating period d is larger, the diffraction angle $\theta_m$ for the same mth diffraction order becomes smaller. Thus, when the grating period d is large, the different diffraction orders may be more narrowly spaced or more densely packed.

The intensity of the electrical field of the plane wave at angle $\theta$ may be determined by the diffraction by a single slit and the interference by the multiple slits of the grating. For example, when N grooves of the diffraction grating are illuminated by the incident wave, the intensity of the electrical field of the plane wave at angle $\theta$ may be determined by:

$$I(\theta) = I_0 \left[\operatorname{sinc}\left(\frac{\pi \alpha}{\lambda}\sin\theta\right)\right]^2 \left[\frac{\sin\left(\frac{N\pi d}{\lambda}\sin\theta\right)}{\sin\left(\frac{\pi d}{\lambda}\sin\theta\right)}\right]^2,$$

Where the factor $$\left[\operatorname{sinc}\left(\left(\frac{\pi \alpha}{\lambda}\right)\sin\theta\right)\right]^2$$

represent e diffraction effect of a single slit with a width a, and the factor $$\left[\frac{\sin\left(\frac{N\pi d}{\lambda}\sin\theta\right)}{\sin\left(\frac{\pi d}{\lambda}\sin\theta\right)}\right]^2$$

represents the interference effect of the N grooves (or slits) of the grating.

Figure 4A:
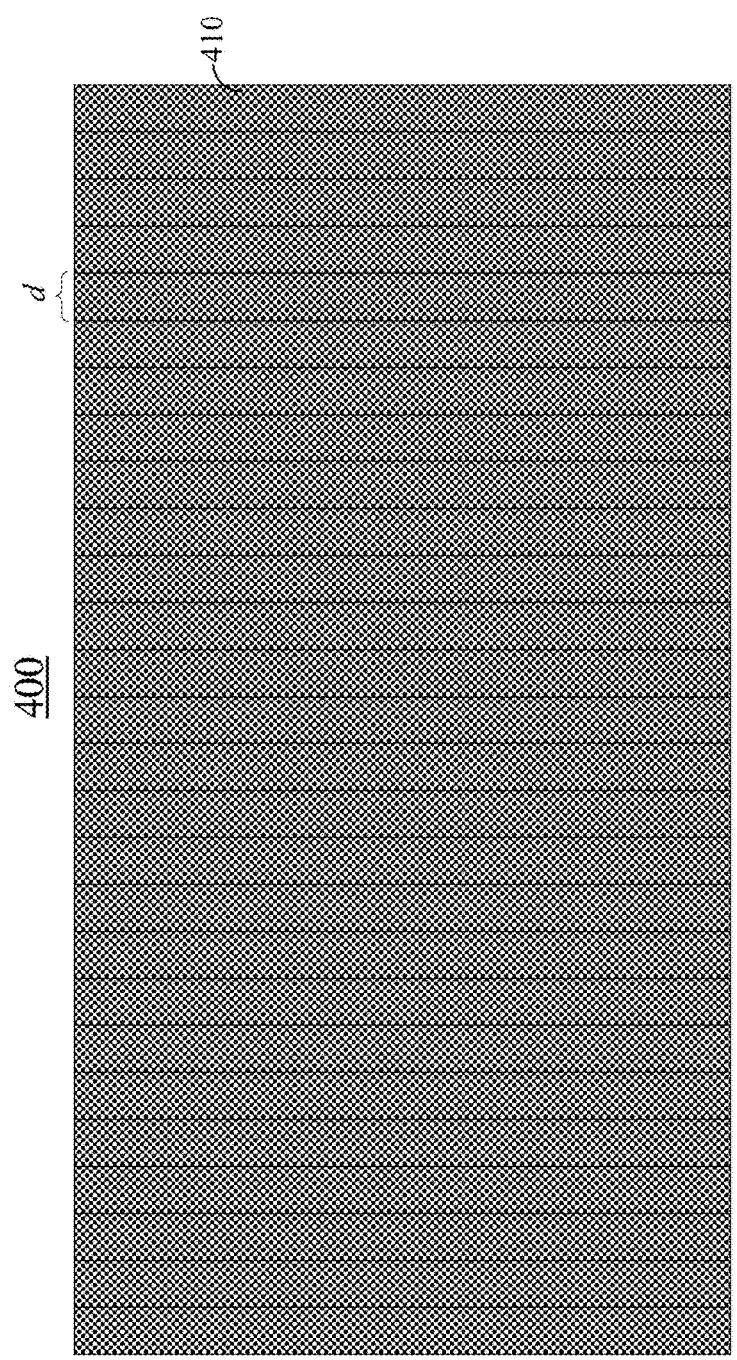
FIG. 4A illustrates an example one-dimensional diffractive optical element for generating a one-dimensional structured light pattern including multiple diffraction spots.

FIG. 4A illustrates an example one-dimensional diffractive optical element 400 for generating a one-dimensional structured light pattern including multiple diffraction spots. One-dimensional diffractive optical element 400 may include a plurality of grooves 410 arranged in a one-dimensional array. Each groove 410 may have a width d and may have any desired amplitude and/or phase profile within the groove. One-dimensional diffractive optical element 400 may be transmissive or reflective and in some embodiments, a component of the system 100.

Figure 4B:
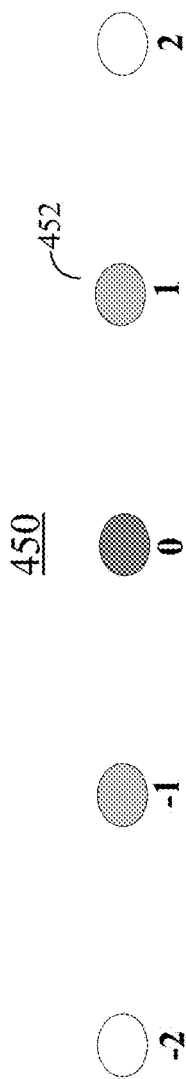
FIG. 4B illustrates an example one-dimensional structured light pattern including multiple diffraction spots generated by the one-dimensional diffractive optical element of FIG. 4A.

FIG. 4B illustrates an example one-dimensional structured light pattern 450 including multiple diffraction spots 452 generated by the one-dimensional diffractive optical element 400 of FIG. 4A. In the representative example shown in FIG. 4B, one-dimensional structured light pattern 450 includes 5 diffraction spots 452 with non-uniform intensities. Because the period d of one-dimensional diffractive optical element 400 is relative small, the separation between the diffraction spots are relatively large.

Figure 5:
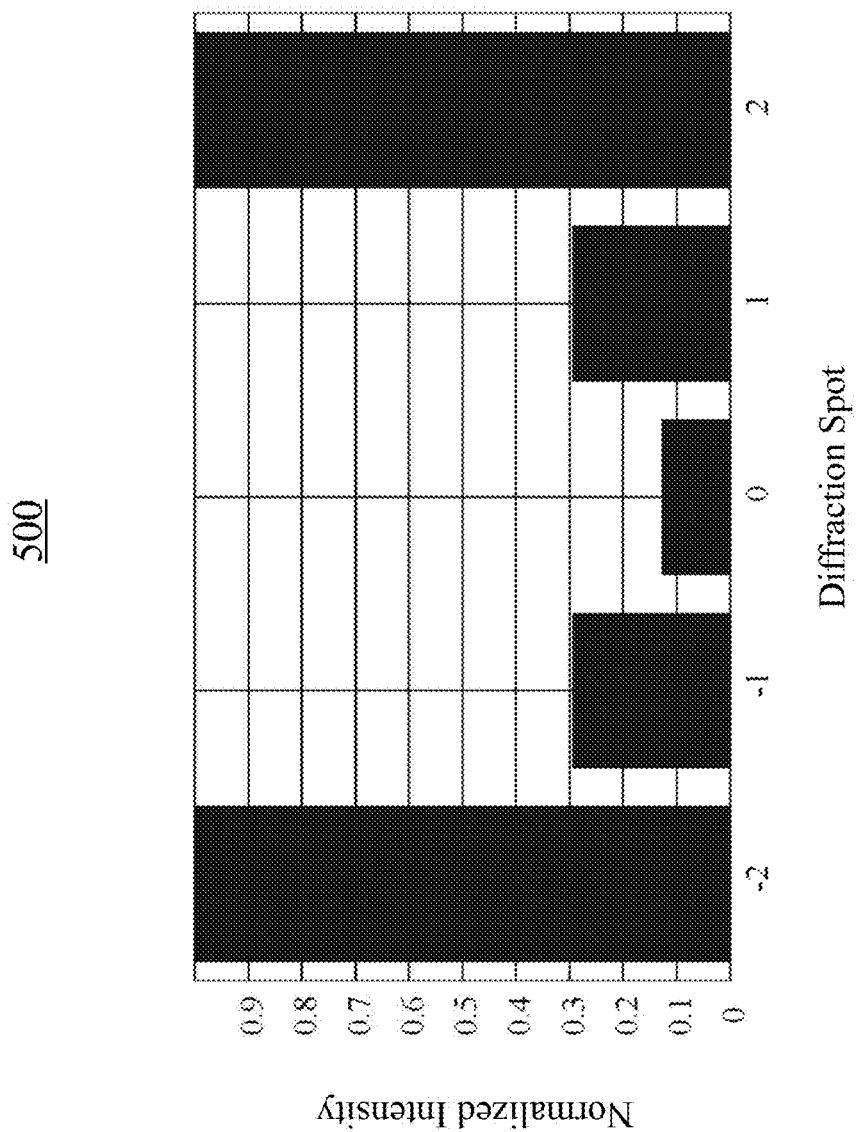
FIG. 5 illustrates the desired intensity profile of an example one-dimensional structured light pattern including multiple diffraction spots.

FIG. 5 illustrates the desired or designed intensity profile 500 of an example one-dimensional structured light pattern including multiple diffraction spots. In the example, the intensities of the diffraction spots are not uniform and are normalized based on the maximum desired intensity. In some applications, it may be desirable to use a structured light pattern with a uniform intensity profile. In some applications, it may be desirable to use a structured light pattern with a non-uniform intensity profile, such as the one shown in FIG. 5 where the light intensity of the diffraction spot at the center is the lowest and the light intensity of the outermost diffract spots (±2nd order in FIG. 5) is the highest. This may be used to pre-compensate for the different losses of the different diffraction orders during the propagation and reflection on different paths. It is noted that the techniques disclosed herein can be used to achieve any desired intensity profile (or pattern), regardless of whether the desired intensity profile is uniform or non-uniform.

Figure 6:
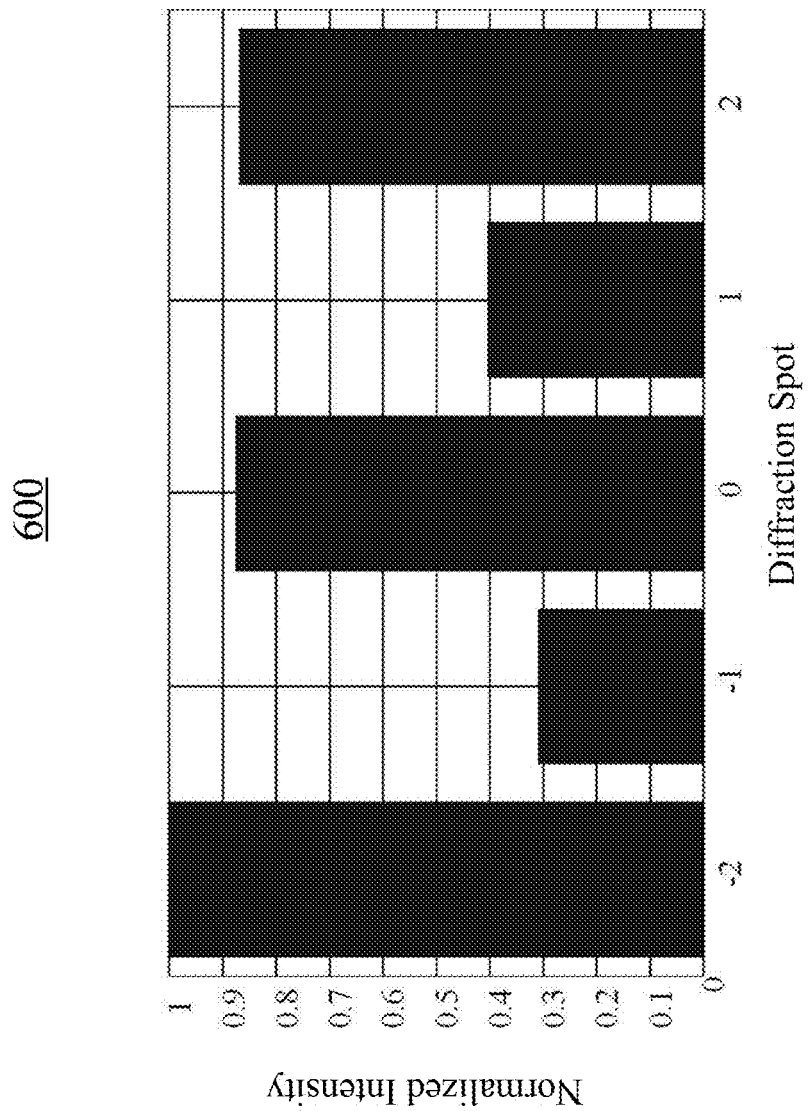
FIG. 6 illustrates the normalized actual intensity profile of an example one-dimensional structured light pattern including multiple diffraction spots generated by an example one-dimensional diffractive optical element with manufactured errors or design approximations.
Figure 7:
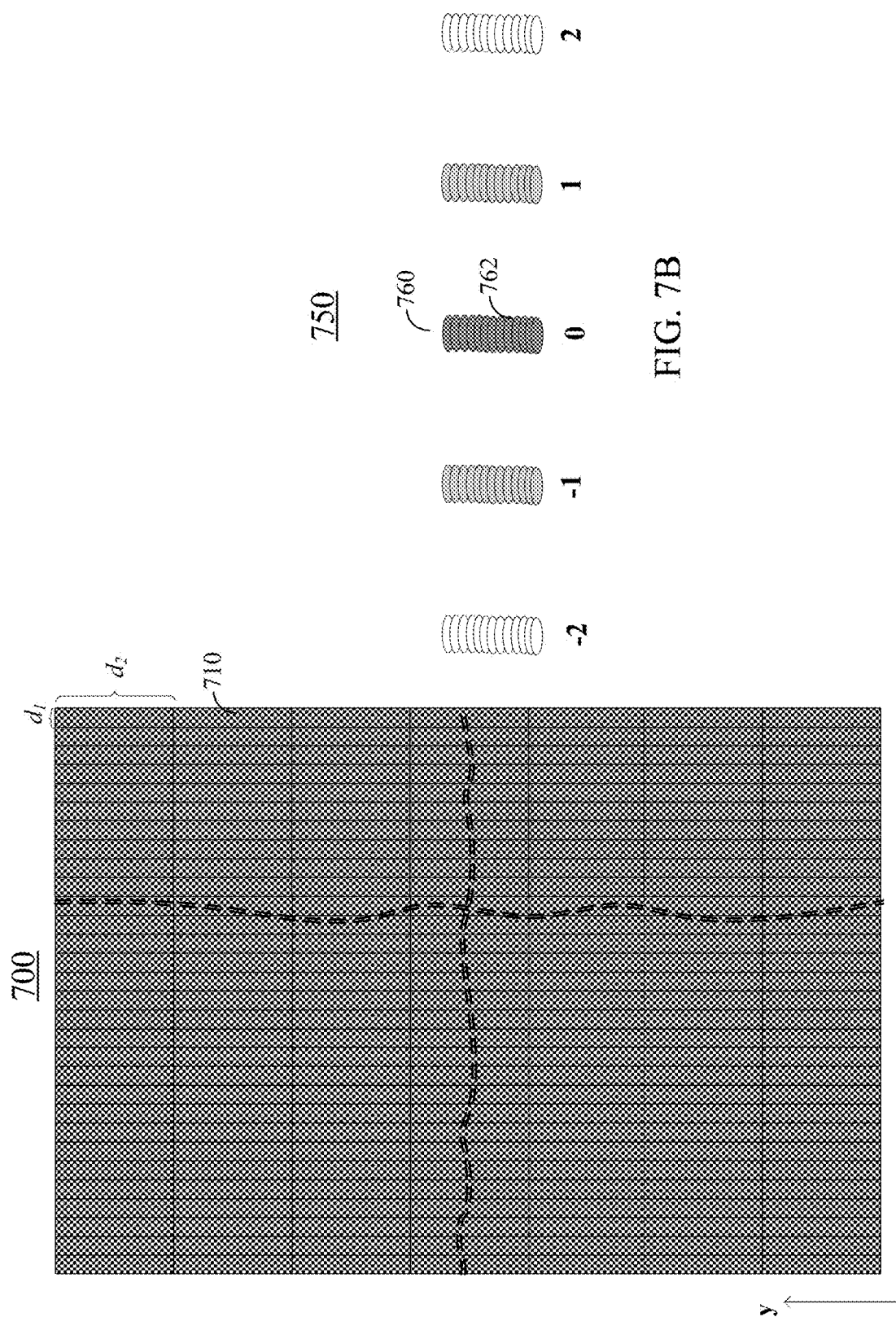
FIG. 7A illustrates an example two-dimensional diffractive optical element for generating a one-dimensional structured light pattern including multiple diffraction spots and having a desired intensity pattern, according to certain embodiments.
FIG. 7B illustrates an example one-dimensional structured light pattern including multiple diffraction spots generated by the two-dimensional diffractive optical element of FIG. 7A, where each diffraction spot includes multiple densely packed small diffraction spots, according to certain embodiments.

FIG. 6 illustrates the normalized actual intensity profile 600 of an example one-dimensional structured light pattern including multiple diffraction spots generated by an example one-dimensional diffractive optical element with manufactured errors or design approximations. The target or desired intensity profile of the one-dimensional structured light pattern to be generated by the designed one-dimensional diffractive optical element is shown in FIG. 5. Due to manufacturing errors and/or design approximations, the actual intensity profile 600 differs significantly from the desired intensity profile 500. For example, intensity profile 600 shows a much stronger-than-desired zero order. Thus, the example one-dimensional diffractive optical element may not meet the requirements of the intended applications.

Techniques disclosed herein may generate the 1-D multi-spot pattern with the desired intensity profile while having an improved tolerance for design and manufacturing inaccuracy, such as manufacturing process variations or defects, and/or design approximations or round-off errors. Thus, the diffractive optical elements can be designed and manufactured with a higher yield (and thus a lower cost per device)

using existing fabrication techniques. In one implementation, a 2-D DOE with different periods in two orthogonal dimensions may be used to generate an aggregated one-dimensional multi-spot pattern with a desired intensity profile. For example, the period in one dimension of the DOE may be much larger than (e.g., more than 100 times or more of) the period of the DOE in the orthogonal dimension. As a result, a plurality of densely packed 1-D multi-spot patterns may be generated by the 2-D DOE. The plurality of densely packed 1-D multi-spot patterns may at least partially overlap with each other at a target plane such that the aggregated light pattern may appear to be a 1-D multi-spot pattern, where each spot of the aggregated 1-D multi-spot pattern may include an array of densely packed small diffraction spots arranged in a direction different from the direction of the desired 1-D multi-spot 10 pattern. Thus, the overall intensity of each spot of the aggregated 1-D multi-spot pattern at a given area may be the sum (or average) of the intensities of the densely packed small spots, and therefore may be less affected by the variation of the intensity of each individual densely packed small spot.

FIG. 7A illustrates an example two-dimensional diffractive optical element 700 for 15 generating a one-dimensional structured light pattern including multiple diffraction spots and having a desired intensity pattern, according to certain embodiments. Two-dimensional diffractive optical element 700 may include a plurality of tiles 710 arranged in a two-dimensional array. Each tile 710 may have a size of $d_1 \times d_2$. Thus, the period of two-dimensional diffractive optical element 700 in the x direction may be $d_1$, and the period of two-dimensional diffractive optical element 700 in the y direction may be $d_2$. In various implementations, $d_1$ may be much smaller than $d_2$. For example, in some implementations, $d_1$ may be less than one hundredth of $d_2$. Each tile 710 may have any desired (continuous or multilevel) amplitude and/or phase profile within the tile. Two-dimensional diffractive optical element 700 may be either transmissive or reflective.

FIG. 7B illustrates an example one-dimensional structured light pattern 750 including multiple diffraction spots generated by the example two-dimensional diffractive optical element 700 of FIG. 7A, where each diffraction spot includes multiple densely packed small diffraction spots, according to certain embodiments. In the example, one-dimensional structured light pattern 750 includes 5 large diffraction spots 760 with non-uniform intensities. Because the period $d_1$ of two-dimensional diffractive optical element 700 in the x direction is relative small, the separation between the 5 large diffraction spots in the x direction is relatively large. Each large diffraction spot 760 may include a plurality of small diffraction spots 762 distributed in the y direction. Because the period $d_2$ of two-dimensional diffractive optical element 700 in the y direction is relative large, the separation between the small diffraction spots in the y direction is relatively small. As shown in FIG. 7B, small diffraction spots 762 in a large diffraction spot may at least partially overlap in the y direction on a target plane, and thus may aggregately form a continuous large diffraction spot 760 on the target plane.

Structured light pattern 750 may also be viewed as a plurality of closed packed one-dimensional light patterns each including 5 small diffraction spots in the x direction, where a separation between two adjacent one-dimensional light patterns is much smaller than the separation between two adjacent diffraction spots in each one-dimensional light pattern. For example, the separation angle between each pair of adjacent one-dimensional light patterns of the plurality of one-dimensional light patterns in the second direction and with respect to the two-dimensional diffractive optical element is less than 0.5 degree, less than 0.2 degree, or less than 0.1 degree. Such separation may be achieved by designing two-dimensional diffractive optical element 700 to have a period in the second direction (e.g., y direction) at least 40, 100, or 200 times of a period in the first direction (e.g., x direction).

In some implementations, an angle of view of one-dimensional structured light pattern 750 with respect to the projector may be greater than 1000 (e.g., greater than 140°) in the x direction, and an angle of view of one-dimensional structured light pattern 750 with respect to the projector may be less than 5°, 2°, or 1° in the y direction. Thus, overall, structured light pattern 750 may appear to be one dimensional.

In some implementations, an optical element, such as a cylindrical lens, an asymmetrical lens, or a diffractive optical element, may be used to concentrate light of the plurality of one-dimensional light patterns in the y-direction to further reduce the angle of view of one-dimensional structured light pattern 750 with respect to the projector in the y direction. In some implementations, an optical element, such as an optical beam homogenizer or an optical diffuser, may be used to combine small diffraction spots 762 distributed in the y direction to create large diffraction spot 760 with a more uniform power distribution across the spot. The optical beam homogenizer or optical diffuser may include, for example, a micro-lens array, a micro-mirror array, a micro-prism array, a diffractive optical element, and the like.

Figure 8:
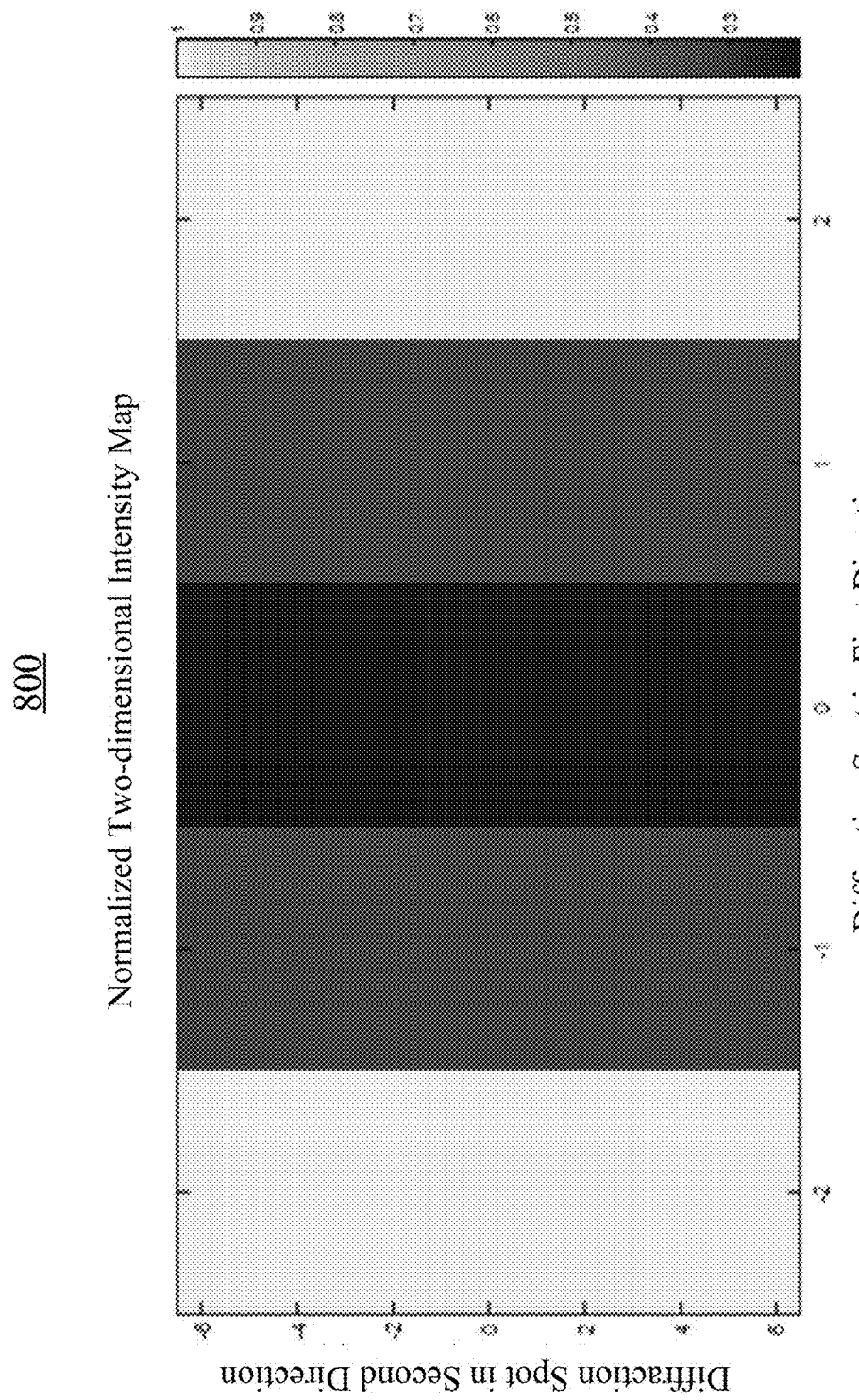
FIG. 8 illustrates the designed intensity profile of an example one-dimensional structured light pattern comprising multiple beam spots each formed by a plurality of densely packed small diffraction spots, according to certain embodiments.

FIG. 8 illustrates the desired or designed intensity profile 800 of an example one-dimensional structured light pattern comprising multiple beam spots each formed by a plurality 5 of densely packed small diffraction spots, according to certain embodiments. The one-dimensional structured light pattern (e.g., generated by the system 100) may include 5 large diffraction spots distributed in the first direction. Each of the 5 large diffraction spots may include 13 small diffraction spots densely distributed in the second direction. The desired intensities of the 5 large diffraction spots may be non-uniform as represented by the different gray scale levels. The designed intensities of the 13 small diffraction spots for each large diffraction spot may be the same. The desired intensities shown in FIG. 8 is normalized based on the maximum desired intensity.

Figure 9:
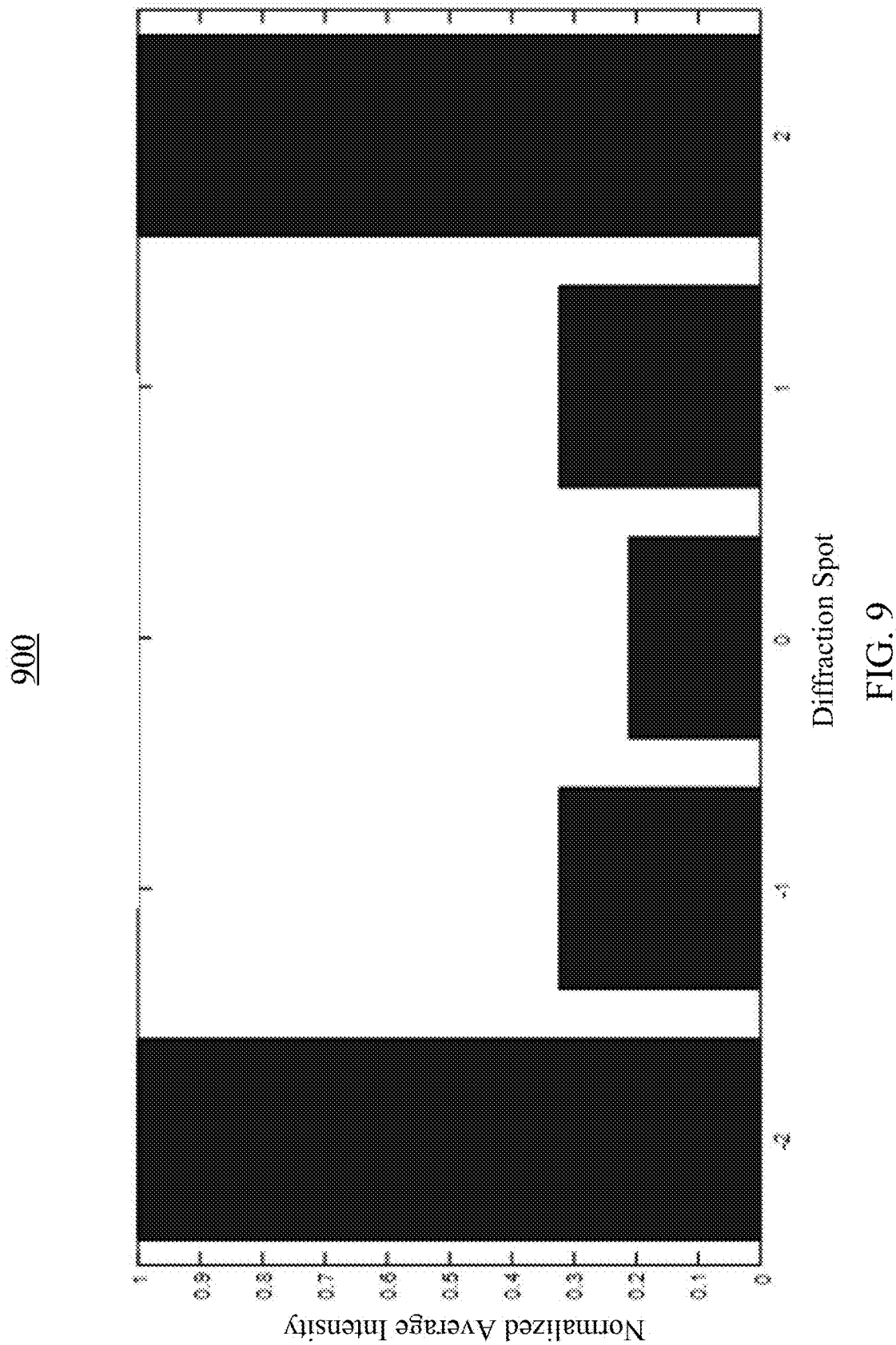
FIG. 9 illustrates the averaged intensity profile of the one-dimensional structured light pattern comprising multiple beam spots each formed by a plurality of densely packed small diffraction spots shown in FIG. 8, according to certain embodiments.

FIG. 9 illustrates the averaged intensity profile 900 of the one-dimensional structured light pattern comprising multiple beam spots each formed by a plurality of densely packed small diffraction spots shown in FIG. 8, according to certain embodiments. In FIG. 9, the intensity of each of the five large diffraction spots may be the average (or sum) of the intensities of the 13 small diffraction spots included in the large diffraction spot.

Figure 10:
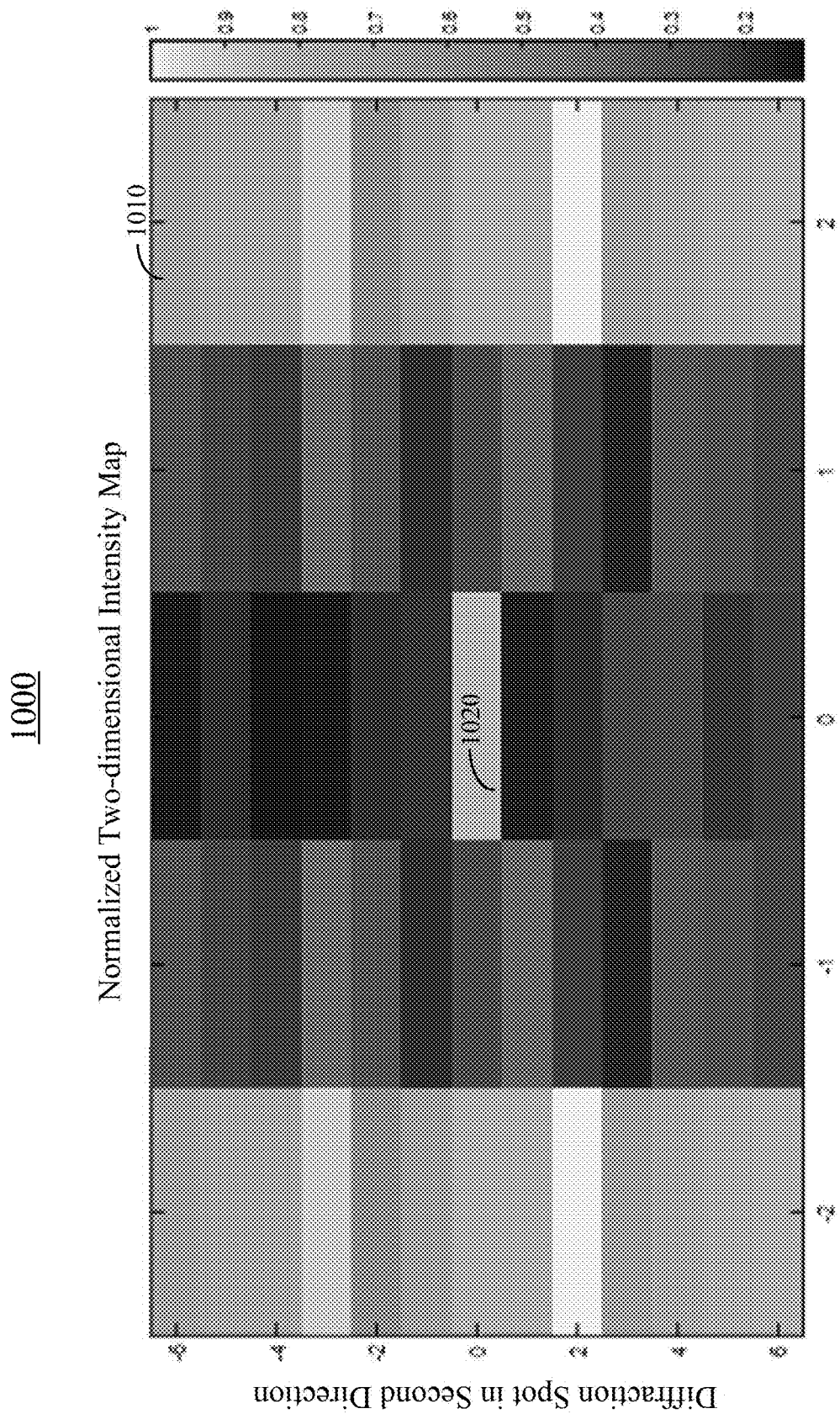
FIG. 10 illustrates the actual intensity profile of an example one-dimensional structured light pattern comprising multiple beam spots each formed by a plurality of densely packed small diffraction spots, where the relative intensities of at least some small diffraction spots may be different from the designed intensities due to, for example, manufacturing errors.

FIG. 10 illustrates the actual intensity profile 1000 of an example one-dimensional structured light pattern comprising multiple large beam spots each formed by a plurality of densely packed small diffraction spots 1010, according to certain embodiments. The actual intensities of at least some small diffraction spots 1010 may be significantly different from the designed intensities (as shown in FIG. 8) due to, for example, manufacturing errors or manufacturing process variations. For example, the actual intensities of the 13 small diffraction spots for each large diffraction spot may not be uniform. The center small spot 1020 may have an intensity that is much higher than the designed intensity. However, because the 13 small diffraction spots for each large diffraction spot are closely distributed, they form an indistinguishable single large diffraction spot. The overall intensity of the large diffraction spot (which may be the average or sum of the intensities of the 13 small diffraction spots) may be significantly different from the intensities of some erroneous individual small diffraction spots. The one-dimensional structured light pattern may be generated by the system 100 of FIG. 1.

Figure 11:
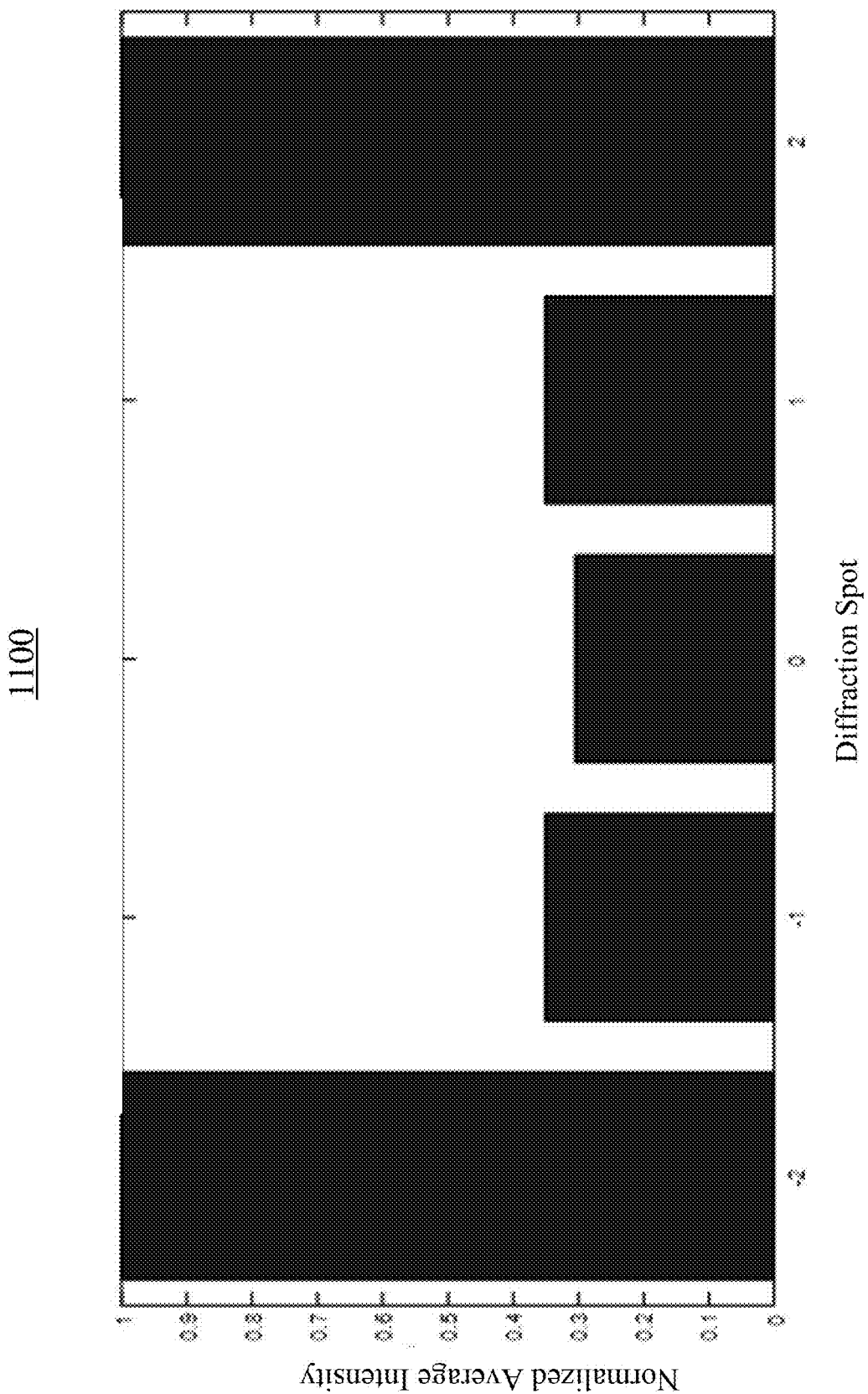
FIG. 11 illustrates the averaged intensity profile of the one-dimensional structured light pattern comprising multiple beam spots each formed by a plurality of densely packed small diffraction spots shown in FIG. 10, according to certain embodiments.

FIG. 11 illustrates the averaged intensity profile 1100 of the one-dimensional structured light pattern comprising multiple beam spots each formed by a plurality of densely packed small diffraction spots shown in FIG. 10, according to certain embodiments. As shown in FIG. 11, the averaged intensity profile 1100 is very close to the designed intensity profile 900, in spite of the variations of the intensities of some individual small diffraction spots shown in FIG. 10.

In some implementations, a one-dimensional structured light pattern with a desired intensity pattern may be generated by a first optical element (e.g., a two-dimensional diffractive optical element with comparable periods in two orthogonal directions) configured to generate a two-dimensional light pattern, and a second optical element configured to concentrate light in at least one direction. For example, the two-dimensional diffractive optical element may generate a two-dimensional light pattern that includes a plurality of one-dimensional light patterns, such as the two-dimensional light patterns shown in FIGS. 2B-2D. The second optical element may be configured to concentrate the two-dimensional light pattern at least in a direction perpendicular to each of the plurality of one-dimensional light patterns, such that the light spots in the direction perpendicular to each of the plurality of one-dimensional light patterns may be combined into one light spot. In some implementations, the second optical element may include, for example, a cylindrical lens or an asymmetrical lens. The optical elements may be components of the system 100.

Figure 12:
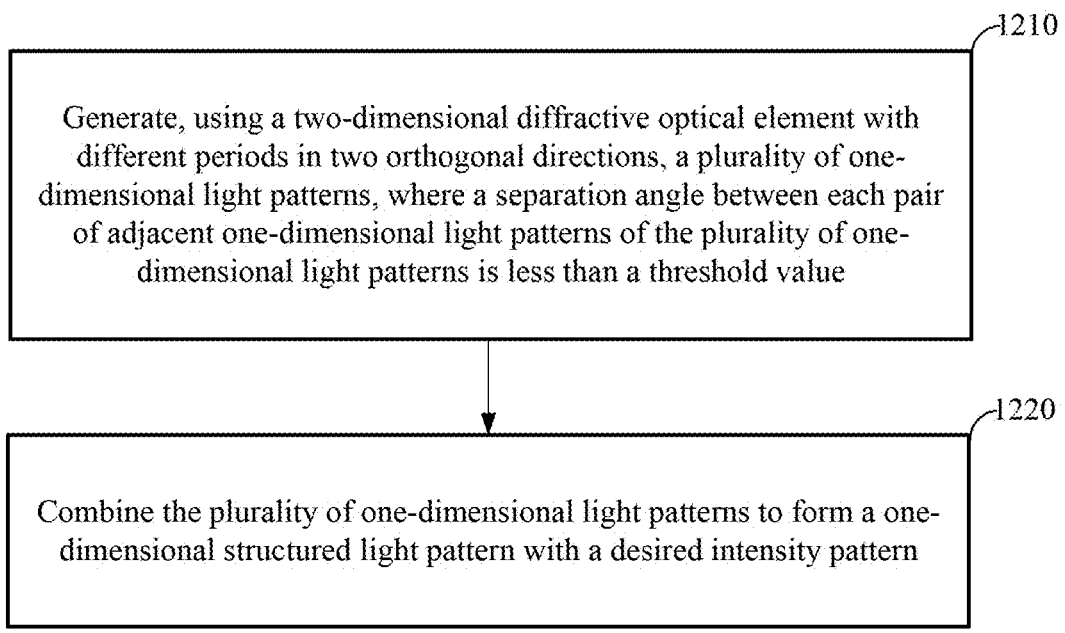
FIG. 12 is a flow chart illustrating an example method for generating a one-dimensional structured light pattern with a desired intensity pattern, according to certain embodiments.

FIG. 12 is a flow chart illustrating an example method 1200 for generating a one-dimensional structured light pattern with a desired intensity pattern, according to certain embodiments. The method may be performed by, for example, system 100 of FIG. 1, using a two-dimensional diffractive optical element, such as two-dimensional diffractive optical element 700 of FIG. 7A.

At block 1210, a plurality of one-dimensional light patterns may be generated using a two-dimensional diffractive optical element with different periods in two orthogonal directions. Each of the one-dimensional light patterns may include a one-dimensional light pattern in the first direction. The plurality of one-dimensional light patterns may be distributed in a second 25 direction different from the first direction. A separation angle between each pair of adjacent one-dimensional light patterns of the plurality of one-dimensional light patterns in the second direction and with respect to the two-dimensional diffractive optical element may be less than a threshold value. For example, in some implementations, the separation angle between each pair of adjacent one-dimensional light patterns of the plurality of one-dimensional light patterns in 30 the second direction and with respect to the two-dimensional diffractive optical element may be less than 0.5 degree, less than 0.2 degree, or less than 0.1 degree. Such a separation may be achieved by designing the two-dimensional diffractive optical element to have a period in the second direction at least 40, 100, 150, or 200 times of a period in the first direction.

At block 1220, the plurality of one-dimensional light patterns may be combined to form the one-dimensional structured light pattern with the desired intensity pattern. As described above, the separation angle between each pair of adjacent one-dimensional light patterns of the plurality of one-dimensional light patterns in the second direction and with respect to the two-dimensional diffractive optical element may be less than a threshold value, such as 0.5 degree, 0.2 degree, or 0.1 degree. Thus, each pair of adjacent one-dimensional light patterns of the plurality of one-dimensional light patterns may at least partially overlap in the second direction to form larger beam spots at a target plane. In this way, the overall intensity of the larger beam spot may be the average or the sum of the intensities of multiple small beam spots.

It is noted that even though the examples described above relate to generate a one-dimensional structured light pattern with a desired intensity profile, techniques described herein may also be used to generate a two-dimensional structured light pattern with a desired intensity profile. For example, techniques described herein may also be used to generate a two-dimensional structured light pattern shown in FIG. 2C with a desired intensity profile. In one example implementation, five two-dimensional diffractive optical elements (e.g., two-dimensional diffractive optical elements 700) may be used to generate the two-dimensional structured light pattern shown in FIG. 2C with the desired intensity profile, where each two-dimensional diffractive optical element (e.g., two-dimensional diffractive optical element 700) may be used to generate one of the five horizontal lines of the two-dimensional structured light pattern shown in FIG. 2C with the desired intensity profile.

Various general purpose or special purpose devices may be used to implement some of the methods or perform some of the operations disclosed herein. The devices may be portable (e.g., a mobile phone or a laptop computer) or stationary (e.g., a general-purpose desktop computer or a server). Some devices may include some or all components for performing some or all operations disclosed herein. Some devices may be combined with one or more other devices to perform some or all operations disclosed herein.

Figure 13:
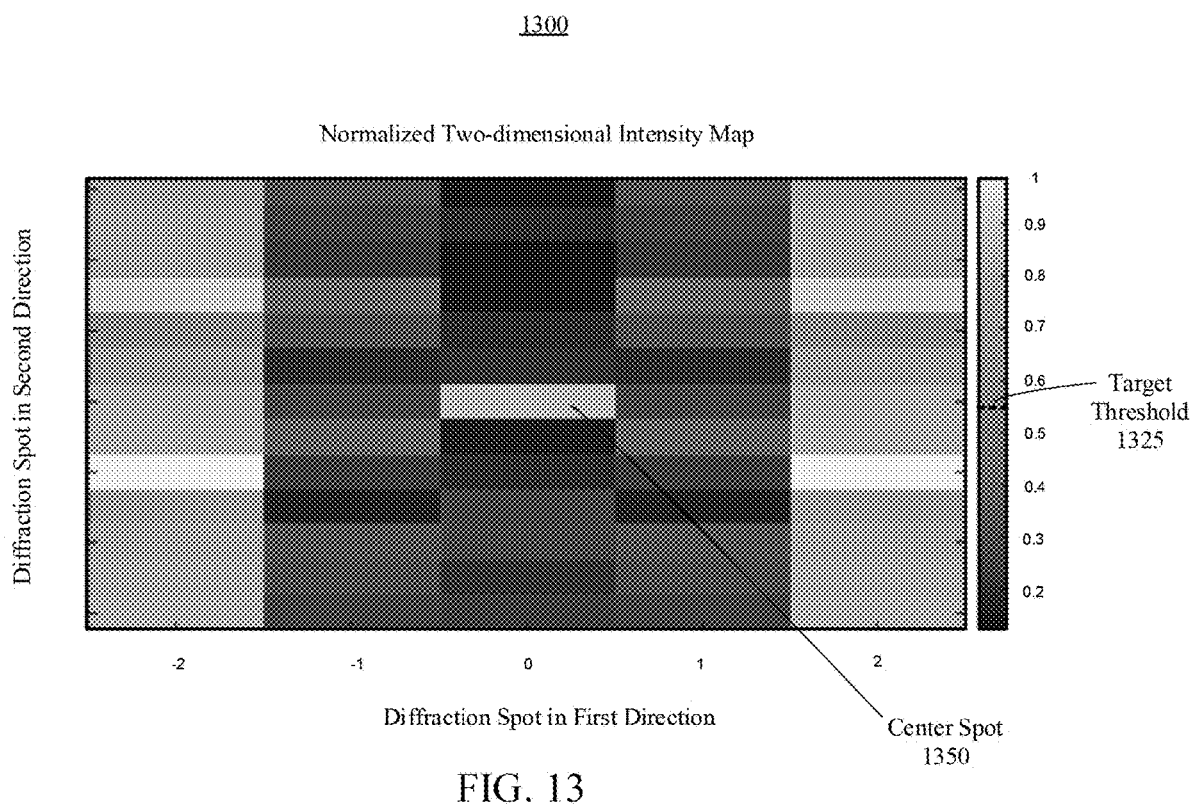
FIG. 13 illustrates the actual intensity profile of an example one-dimensional structured light pattern with a delineated target threshold, in accordance with one or more embodiments.

FIG. 13 illustrates the actual intensity profile 1300 of an example one-dimensional structured light pattern with a delineated target threshold 1325, according to certain embodiments. The intensity profile 1300 of the one-dimensional (1D) structured light pattern is substantially similar to that described in FIG. 10, where the structured light pattern includes a plurality of 1D light patterns parallel to a first direction and compressed in a second direction orthogonal to the first direction. The plurality of 1D light patterns are comprised of densely packed large beam spots and/or small diffraction spots, aggregated to form the 1D structured light pattern. The target intensities of each diffraction order of the plurality of 1D light patterns are shown in FIG. 8, where the $0^{th}$ order row of 1D light patterns has the lowest target brightness. In some embodiments, the target brightness is zero, or substantially zero, such that the structured light pattern is safe when observed by an eye of a user of a device that outputs the 1D structured light pattern (e.g., a depth camera assembly of a head mounted display).

In some embodiments, a portion of the 1D light pattern overlaps with a portion of an adjacent 1D light pattern, due to the compression in the second direction. For example, a plurality of 1D light patterns of a diffraction order (e.g., the $1^{st}$ diffraction order) may overlap with the adjacent 1D light patterns corresponding to the same diffraction order. In other embodiments, the entirety of the 1D light pattern overlaps with the adjacent 1D light pattern.

In reality, however, the intensities of the 1D light patterns may not match the target intensities. For example, the actual intensity profile 1300 shows a center spot 1350 with a brightness greater than the target intensity. The unintended brightness may be due to one or more manufacturing errors, for example. While each diffraction order of the one-dimensional structured light pattern may not have the target intensity, each of the plurality of 1D light patterns of the $-1^{st}$ order, $0^{th}$ order, and $1^{st}$ order in the first direction may be designed such that they are below the target threshold 1325 of intensity. The target threshold 1325 of intensity has substantially no power, or in some embodiments, minimal power relative to the higher diffraction order. In some embodiments, the target threshold 1325 of intensity is designated such that the user of the device outputting the 1D structured light pattern is not harmed by the intensity of the 1D light pattern. In some embodiments, the $-1^{st}$ order, $0^{th}$ order, and $1^{st}$ order of the aggregate 1D structured light pattern may be designed to be below the target threshold 1325 of intensity. In some embodiments, the remaining diffraction orders of the 1D structured light pattern may be below a target threshold of intensity.

Figure 14:
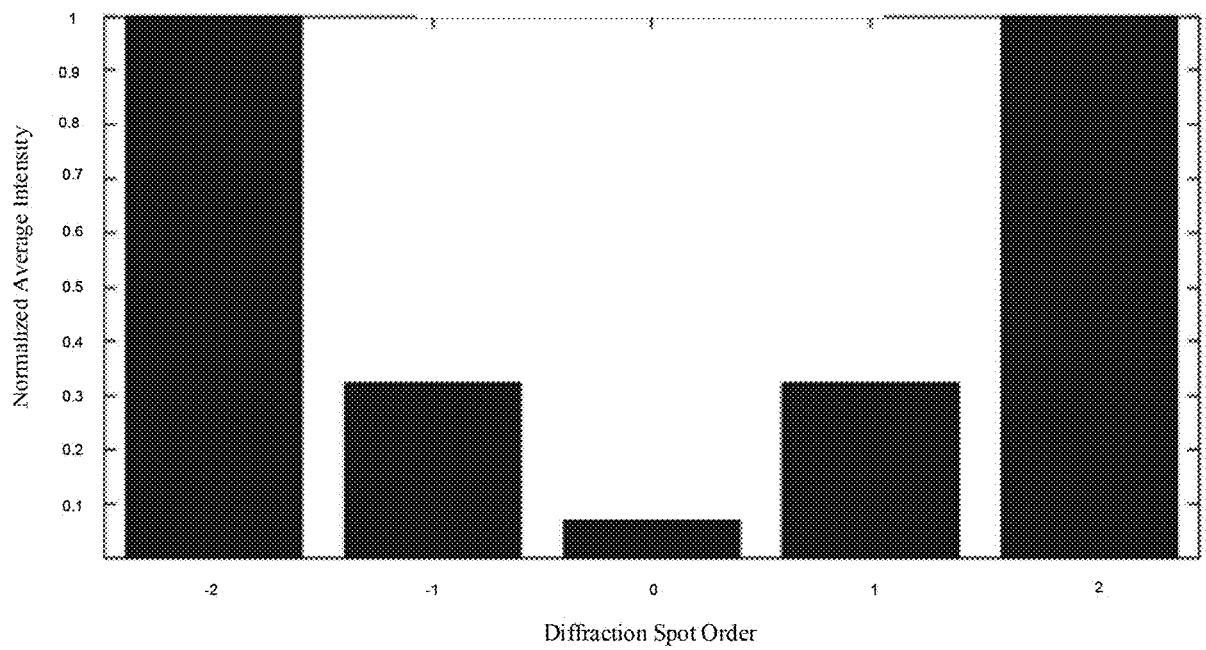
FIG. 14 illustrates the averaged intensity profile of a one-dimensional structured light pattern, with a zeroth diffraction order intensity below the delineated target threshold, in accordance with one or more embodiments.

FIG. 14 illustrates the averaged intensity profile 1400 of a one-dimensional structured light pattern, with a 0th diffraction order intensity below the delineated target threshold, according to some embodiments. In FIG. 14, the intensities are averaged along the second direction. In some embodiments, the unintended brightness of the center spot 1350 of FIG. 13 may be adjusted, for example, by increasing the brightness of the $-1^{st}$ and $1^{st}$ diffraction orders of the one-dimensional (1D) structured light pattern. In some embodiments, the unintended brightness of the center spot 1350 of FIG. 13 may be adjusted by lowering the brightness of the $0^{th}$ diffraction order of the 1D structured light pattern. The resulting normalized average intensity of the $0^{th}$ diffraction order is below a target threshold of intensity (e.g., the target threshold 1325). In some embodiments, each of the plurality of 1D patterns that make up the 1D structured light pattern have an intensity below the target threshold.

Figure 15A:
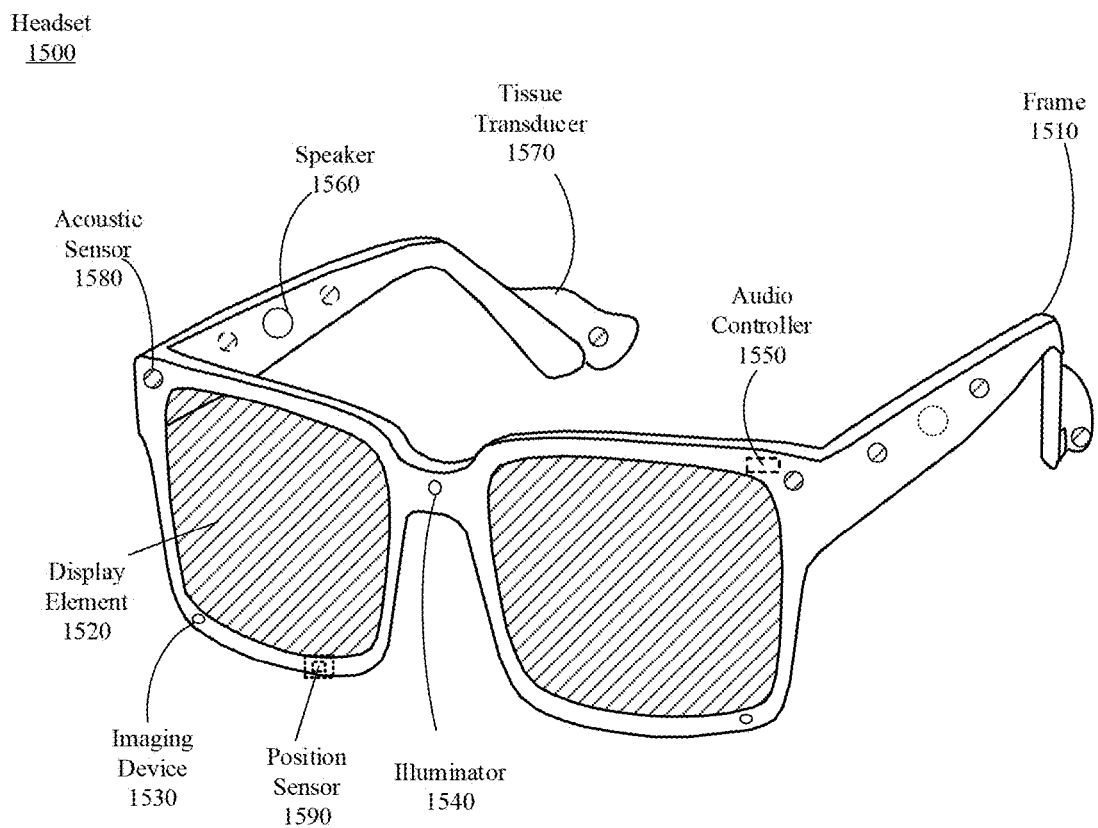
FIG. 15A is a perspective view of a headset implemented as an eyewear device, in accordance with one or more embodiments.

FIG. 15A is a perspective view of a headset implemented as an eyewear device, in accordance with one or more embodiments. FIG. 15A is a perspective view of a headset 1500 implemented as an eyewear device, in accordance with one or more embodiments. In some embodiments, the eyewear device is a near eye display (NED). In general, the headset 1500 may be worn on the face of a user such that content (e.g., media content) is presented using a display assembly and/or an audio system. However, the headset 1500 may also be used such that media content is presented to a user in a different manner. Examples of media content presented by the headset 1500 include one or more images, video, audio, or some combination thereof. The headset 1500 includes a frame, and may include, among other components, a display assembly including one or more display elements 1520, a depth camera assembly (DCA), an audio system, and a position sensor 1590. While FIG. 15A illustrates the components of the headset 1500 in example locations on the headset 1500, the components may be located elsewhere on the headset 1500, on a peripheral device paired with the headset 1500, or some combination thereof. Similarly, there may be more or fewer components on the headset 1500 than what is shown in FIG. 15A.

The frame 1510 holds the other components of the headset 1500. The frame 1510 includes a front part that holds the one or more display elements 1520 and end pieces (e.g., temples) to attach to a head of the user. The front part of the frame 1510 bridges the top of a nose of the user. The length of the end pieces may be adjustable (e.g., adjustable temple length) to fit different users. The end pieces may also include a portion that curls behind the ear of the user (e.g., temple tip, ear piece).

The one or more display elements 1520 provide light to a user wearing the headset 1500. As illustrated the headset includes a display element 1520 for each eye of a user. In some embodiments, a display element 1520 generates image light that is provided to an eyebox of the headset 1500. The eyebox is a location in space that an eye of user occupies while wearing the headset 1500. For example, a display element 1520 may be a waveguide display. A waveguide display includes a light source (e.g., a two-dimensional source, one or more line sources, one or more point sources, etc.) and one or more waveguides. Light from the light source is in-coupled into the one or more waveguides which outputs the light in a manner such that there is pupil replication in an eyebox of the headset 1500. In-coupling and/or outcoupling of light from the one or more waveguides may be done using one or more diffraction gratings. In some embodiments, the waveguide display includes a scanning element (e.g., waveguide, mirror, etc.) that scans light from the light source as it is in-coupled into the one or more waveguides. Note that in some embodiments, one or both of the display elements 1520 are opaque and do not transmit light from a local area around the headset 1500. The local area is the area surrounding the headset 1500. For example, the local area may be a room that a user wearing the headset 1500 is inside, or the user wearing the headset 1500 may be outside and the local area is an outside area. In this context, the headset 1500 generates VR content. Alternatively, in some embodiments, one or both of the display elements 1520 are at least partially transparent, such that light from the local area may be combined with light from the one or more display elements to produce AR and/or MR content.

In some embodiments, a display element 1520 does not generate image light, and instead is a lens that transmits light from the local area to the eyebox. For example, one or both of the display elements 1520 may be a lens without correction (non-prescription) or a prescription lens (e.g., single vision, bifocal and trifocal, or progressive) to help correct for defects in a user's eyesight. In some embodiments, the display element 1520 may be polarized and/or tinted to protect the user's eyes from the sun.

In some embodiments, the display element 1520 may include an additional optics block (not shown). The optics block may include one or more optical elements (e.g., lens, Fresnel lens, etc.) that direct light from the display element 1520 to the eyebox. The optics block may, e.g., correct for aberrations in some or all of the image content, magnify some or all of the image, or some combination thereof.

The DCA determines depth information for a portion of a local area surrounding the headset 1500. The DCA includes one or more imaging devices 1530 and a DCA controller (not shown in FIG. 15A), and may also include an illuminator 1540. In some embodiments, the illuminator 1540 illuminates a portion of the local area with light. The light may be, e.g., structured light (e.g., dot pattern, bars, etc.) in the infrared (IR), IR flash for time-of-flight, etc. In some embodiments, the one or more imaging devices 1530 capture images of the portion of the local area that include the light from the illuminator 1540. As illustrated, FIG. 15A shows a single illuminator 1540 and two imaging devices 1530. In alternate embodiments, there is no illuminator 1540 and at least two imaging devices 1530.

In some embodiments, the DCA includes a light source and two-dimensional (2D) diffractive optical element that outputs a plurality of one-dimensional (1D) light patterns that are parallel to a first direction. The optical element is configured to compress the plurality of 1D light patterns along a second direction to form an aggregate 1D light pattern. In some embodiments, the 1D light patterns have a $0^{th}$ diffraction order with an intensity value below a target threshold.

The DCA controller computes depth information for the portion of the local area using the captured images and one or more depth determination techniques. The depth determination technique may be, e.g., direct time-of-flight (ToF) depth sensing, indirect ToF depth sensing, structured light, passive stereo analysis, active stereo analysis (uses texture added to the scene by light from the illuminator 1540), some other technique to determine depth of a scene, or some combination thereof.

The DCA may include an eye tracking unit that determines eye tracking information. The eye tracking information may comprise information about a position and an orientation of one or both eyes (within their respective eye-boxes). The eye tracking unit may include one or more cameras. The eye tracking unit estimates an angular orientation of one or both eyes based on images captures of one or both eyes by the one or more cameras. In some embodiments, the eye tracking unit may also include one or more illuminators that illuminate one or both eyes with an illumination pattern (e.g., structured light, glints, etc.). The eye tracking unit may use the illumination pattern in the captured images to determine the eye tracking information. The headset 1500 may prompt the user to opt in to allow operation of the eye tracking unit. For example, by opting in the headset 1500 may detect, store, images of the user's any or eye tracking information of the user. In some embodiments, the DCA includes the depth sensing system 100 of FIG. 1.

The audio system provides audio content. The audio system includes a transducer array, a sensor array, and an audio controller 1550. However, in other embodiments, the audio system may include different and/or additional components. Similarly, in some cases, functionality described with reference to the components of the audio system can be distributed among the components in a different manner than is described here. For example, some or all of the functions of the controller may be performed by a remote server.

The transducer array presents sound to user. The transducer array includes a plurality of transducers. A transducer may be a speaker 1560 or a tissue transducer 1570 (e.g., a bone conduction transducer or a cartilage conduction transducer). Although the speakers 1560 are shown exterior to the frame 1510, the speakers 1560 may be enclosed in the frame 1510. In some embodiments, instead of individual speakers for each ear, the headset 1500 includes a speaker array comprising multiple speakers integrated into the frame 1510 to improve directionality of presented audio content. The tissue transducer 1570 couples to the head of the user and directly vibrates tissue (e.g., bone or cartilage) of the user to generate sound. The number and/or locations of transducers may be different from what is shown in FIG. 1A.

The sensor array detects sounds within the local area of the headset 1500. The sensor array includes a plurality of acoustic sensors 1580. An acoustic sensor 1580 captures sounds emitted from one or more sound sources in the local area (e.g., a room). Each acoustic sensor is configured to detect sound and convert the detected sound into an electronic format (analog or digital). The acoustic sensors 1580 may be acoustic wave sensors, microphones, sound transducers, or similar sensors that are suitable for detecting sounds.

In some embodiments, one or more acoustic sensors 1580 may be placed in an ear canal of each ear (e.g., acting as binaural microphones). In some embodiments, the acoustic sensors 1580 may be placed on an exterior surface of the headset 1500, placed on an interior surface of the headset 1500, separate from the headset 1500 (e.g., part of some other device), or some combination thereof. The number and/or locations of acoustic sensors 1580 may be different from what is shown in FIG. 1A. For example, the number of acoustic detection locations may be increased to increase the amount of audio information collected and the sensitivity and/or accuracy of the information. The acoustic detection locations may be oriented such that the microphone is able to detect sounds in a wide range of directions surrounding the user wearing the headset 1500.

The audio controller 1550 processes information from the sensor array that describes sounds detected by the sensor array. The audio controller 1550 may comprise a processor and a computer-readable storage medium. The audio controller 1550 may be configured to generate direction of arrival (DOA) estimates, generate acoustic transfer functions (e.g., array transfer functions and/or head-related transfer functions), track the location of sound sources, form beams in the direction of sound sources, classify sound sources, generate sound filters for the speakers 1560, or some combination thereof.

The position sensor 1590 generates one or more measurement signals in response to motion of the headset 1500. The position sensor 1590 may be located on a portion of the frame 1510 of the headset 1500. The position sensor 1590 may include an inertial measurement unit (IMU). Examples of position sensor 1590 include: one or more accelerometers, one or more gyroscopes, one or more magnetometers, another suitable type of sensor that detects motion, a type of sensor used for error correction of the IMU, or some combination thereof. The position sensor 1590 may be located external to the IMU, internal to the IMU, or some combination thereof.

In some embodiments, the headset 1500 may provide for simultaneous localization and mapping (SLAM) for a position of the headset 1500 and updating of a model of the local area. For example, the headset 1500 may include a passive camera assembly (PCA) that generates color image data. The PCA may include one or more RGB cameras that capture images of some or all of the local area. In some embodiments, some or all of the imaging devices 1530 of the DCA may also function as the PCA. The images captured by the PCA and the depth information determined by the DCA may be used to determine parameters of the local area, generate a model of the local area, update a model of the local area, or some combination thereof. Furthermore, the position sensor 1590 tracks the position (e.g., location and pose) of the headset 1500 within the room. Additional details regarding the components of the headset 1500 are discussed below in connection with FIG. 16.

Figure 15B:
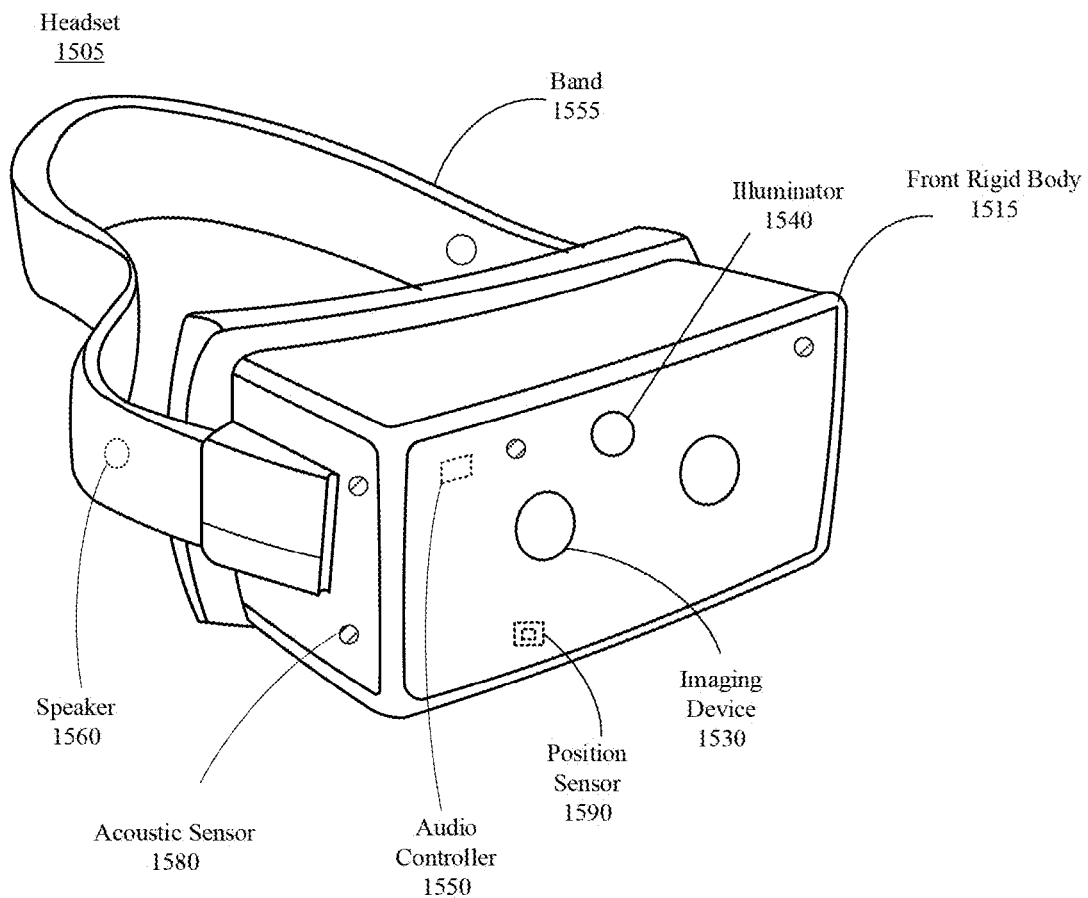
FIG. 15B is a perspective view of a headset implemented as a head-mounted display, in accordance with one or more embodiments.

FIG. 15B is a perspective view of a headset 1505 implemented as a HMD, in accordance with one or more embodiments. In embodiments that describe an AR system and/or a MR system, portions of a front side of the HMD are at least partially transparent in the visible band (~380 nm to 750 nm), and portions of the HMD that are between the front side of the HMD and an eye of the user are at least partially transparent (e.g., a partially transparent electronic display). The HMD includes a front rigid body 1515 and a band 1575.

The headset 1505 includes many of the same components described above with reference to FIG. 15A, but modified to integrate with the HMD form factor. For example, the HMD includes a display assembly, a DCA, an audio system, and a position sensor 1590. FIG. 15B shows the illuminator 1540, a plurality of the speakers 1560, a plurality of the imaging devices 1530, a plurality of acoustic sensors 1580, and the position sensor 1590. The speakers 1560 may be located in various locations, such as coupled to the band 1575 (as shown), coupled to front rigid body 1515, or may be configured to be inserted within the ear canal of a user.

Figure 16:
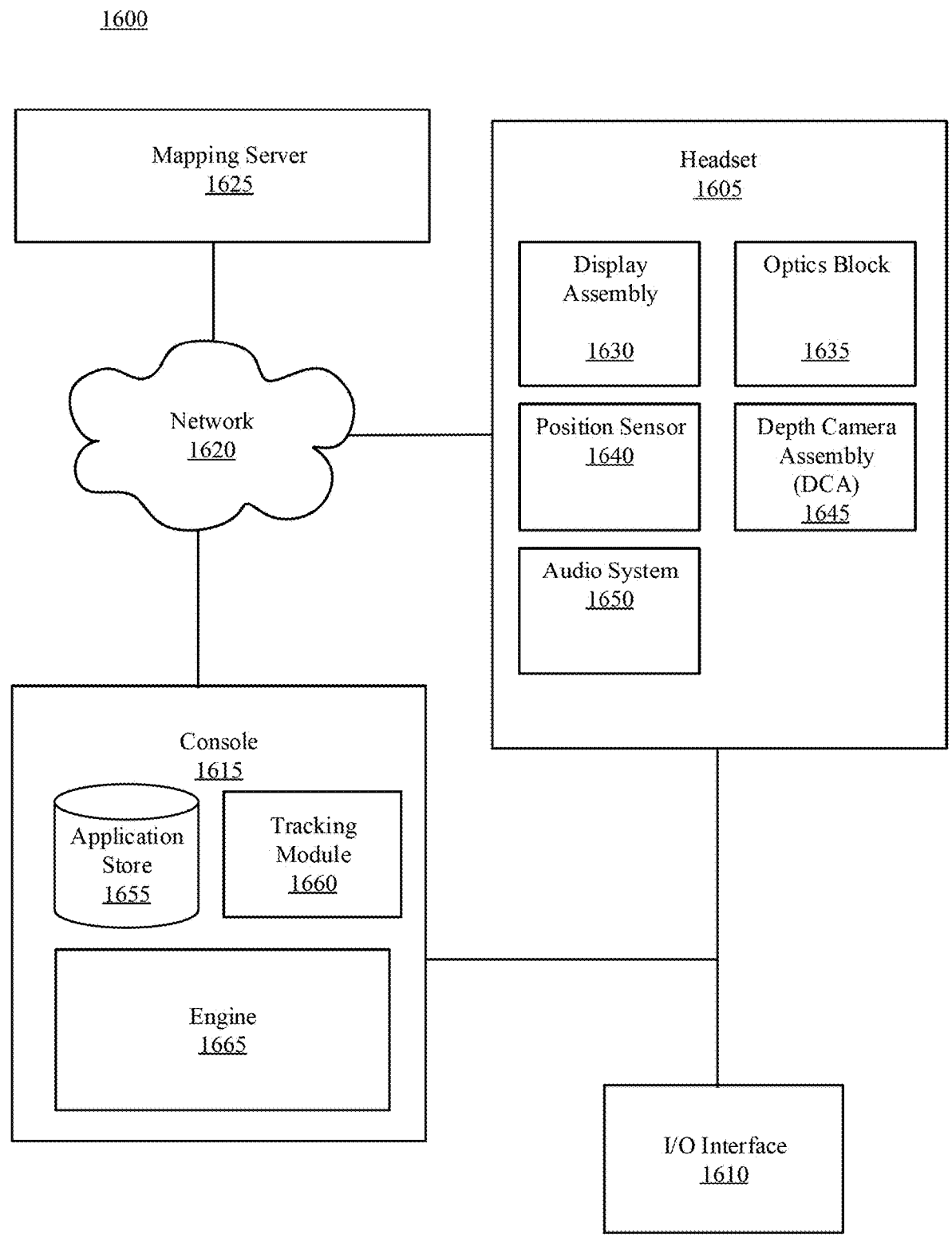
FIG. 16 is a system that includes a headset, in accordance with one or more embodiments.

FIG. 16 is a system 1600 that includes a headset 1605, in accordance with one or more embodiments. In some embodiments, the headset 1605 may be the headset 1500 of FIG. 15A or the headset 1505 of FIG. 15B. The system 1600 may operate in an artificial reality environment (e.g., a virtual reality environment, an augmented reality environment, a mixed reality environment, or some combination thereof). The system 1600 shown by FIG. 16 includes the headset 1605, an input/output (I/O) interface 1610 that is coupled to a console 1615, the network 1620, and the mapping server 1625. While FIG. 16 shows an example system 1600 including one headset 1605 and one I/O interface 1610, in other embodiments any number of these components may be included in the system 1600. For example, there may be multiple headsets each having an associated I/O interface 1610, with each headset and I/O interface 1610 communicating with the console 1615. In alternative configurations, different and/or additional components may be included in the system 1600. Additionally, functionality described in conjunction with one or more of the components shown in FIG. 16 may be distributed among the components in a different manner than described in conjunction with FIG. 16 in some embodiments. For example, some or all of the functionality of the console 1615 may be provided by the headset 1605.

The headset 1605 includes the display assembly 1630, an optics block 1635, one or more position sensors 1640, and the DCA 1645. Some embodiments of headset 1605 have different components than those described in conjunction with FIG. 16. Additionally, the functionality provided by various components described in conjunction with FIG. 16 may be differently distributed among the components of the headset 1605 in other embodiments, or be captured in separate assemblies remote from the headset 1605.

The display assembly 1630 displays content to the user in accordance with data received from the console 1615. The display assembly 1630 displays the content using one or more display elements (e.g., the display elements 120). A display element may be, e.g., an electronic display. In various embodiments, the display assembly 1630 comprises a single display element or multiple display elements (e.g., a display for each eye of a user). Examples of an electronic display include: a liquid crystal display (LCD), an organic light emitting diode (OLED) display, an active-matrix organic light-emitting diode display (AMOLED), a waveguide display, some other display, or some combination thereof. Note in some embodiments, the display element 1520 may also include some or all of the functionality of the optics block 1635.

The optics block 1635 may magnify image light received from the electronic display, corrects optical errors associated with the image light, and presents the corrected image light to one or both eyeboxes of the headset 1605. In various embodiments, the optics block 1635 includes one or more optical elements. Example optical elements included in the optics block 1635 include: an aperture, a Fresnel lens, a convex lens, a concave lens, a filter, a reflecting surface, or any other suitable optical element that affects image light. Moreover, the optics block 1635 may include combinations of different optical elements. In some embodiments, one or more of the optical elements in the optics block 1635 may have one or more coatings, such as partially reflective or anti-reflective coatings.

Magnification and focusing of the image light by the optics block 1635 allows the electronic display to be physically smaller, weigh less, and consume less power than larger displays. Additionally, magnification may increase the field of view of the content presented by the electronic display. For example, the field of view of the displayed content is such that the displayed content is presented using almost all (e.g., approximately 110 degrees diagonal), and in some cases, all of the user's field of view. Additionally, in some embodiments, the amount of magnification may be adjusted by adding or removing optical elements.

In some embodiments, the optics block 1635 may be designed to correct one or more types of optical error. Examples of optical error include barrel or pincushion distortion, longitudinal chromatic aberrations, or transverse chromatic aberrations. Other types of optical errors may further include spherical aberrations, chromatic aberrations, or errors due to the lens field curvature, astigmatisms, or any other type of optical error. In some embodiments, content provided to the electronic display for display is pre-distorted, and the optics block 1635 corrects the distortion when it receives image light from the electronic display generated based on the content.

The position sensor 1640 is an electronic device that generates data indicating a position of the headset 1605. The position sensor 1640 generates one or more measurement signals in response to motion of the headset 1605. The position sensor 1590 is an embodiment of the position sensor 1640. Examples of a position sensor 1640 include: one or more IMUs, one or more accelerometers, one or more gyroscopes, one or more magnetometers, another suitable type of sensor that detects motion, or some combination thereof. The position sensor 1640 may include multiple accelerometers to measure translational motion (forward/back, up/down, left/right) and multiple gyroscopes to measure rotational motion (e.g., pitch, yaw, roll). In some embodiments, an IMU rapidly samples the measurement signals and calculates the estimated position of the headset 1605 from the sampled data. For example, the IMU integrates the measurement signals received from the accelerometers over time to estimate a velocity vector and integrates the velocity vector over time to determine an estimated position of a reference point on the headset 1605. The reference point is a point that may be used to describe the position of the headset 1605. While the reference point may generally be defined as a point in space, however, in practice the reference point is defined as a point within the headset 1605.

The DCA 1645 generates depth information for a portion of the local area. The DCA includes one or more imaging devices and a DCA controller. The DCA 1645 may also include an illuminator. Operation and structure of the DCA 1645 is described above with regard to FIG. 1A.

The audio system 1650 provides audio content to a user of the headset 1605. The audio system 1650 is substantially the same as the audio system 200 describe above. The audio system 1650 may comprise one or acoustic sensors, one or more transducers, and an audio controller. The audio system 1650 may provide spatialized audio content to the user. In some embodiments, the audio system 1650 may request acoustic parameters from the mapping server 1625 over the network 1620. The acoustic parameters describe one or more acoustic properties (e.g., room impulse response, a reverberation level, etc.) of the local area. The audio system 1650 may provide information describing at least a portion of the local area from e.g., the DCA 1645 and/or location information for the headset 1605 from the position sensor 1640. The audio system 1650 may generate one or more sound filters using one or more of the acoustic parameters received from the mapping server 1625, and use the sound filters to provide audio content to the user.

The I/O interface 1610 is a device that allows a user to send action requests and receive responses from the console 1615. An action request is a request to perform a particular action. For example, an action request may be an instruction to start or end capture of image or video data, or an instruction to perform a particular action within an application. The I/O interface 1610 may include one or more input devices. Example input devices include: a keyboard, a mouse, a game controller, or any other suitable device for receiving action requests and communicating the action requests to the console 1615. An action request received by the I/O interface 1610 is communicated to the console 1615, which performs an action corresponding to the action request. In some embodiments, the I/O interface 1610 includes an IMU that captures calibration data indicating an estimated position of the I/O interface 1610 relative to an initial position of the I/O interface 1610. In some embodiments, the I/O interface 1610 may provide haptic feedback to the user in accordance with instructions received from the console 1615. For example, haptic feedback is provided when an action request is received, or the console 1615 communicates instructions to the I/O interface 1610 causing the I/O interface 1610 to generate haptic feedback when the console 1615 performs an action.

The console 1615 provides content to the headset 1605 for processing in accordance with information received from one or more of: the DCA 1645, the headset 1605, and the I/O interface 1610. In the example shown in FIG. 16, the console 1615 includes an application store 1655, a tracking module 1660, and an engine 1665. Some embodiments of the console 1615 have different modules or components than those described in conjunction with FIG. 16. Similarly, the functions further described below may be distributed among components of the console 1615 in a different manner than described in conjunction with FIG. 16. In some embodiments, the functionality discussed herein with respect to the console 1615 may be implemented in the headset 1605, or a remote system.

The application store 1655 stores one or more applications for execution by the console 1615. An application is a group of instructions, that when executed by a processor, generates content for presentation to the user. Content generated by an application may be in response to inputs received from the user via movement of the headset 1605 or the I/O interface 1610. Examples of applications include: gaming applications, conferencing applications, video playback applications, or other suitable applications.

The tracking module 1660 tracks movements of the headset 1605 or of the I/O interface 1610 using information from the DCA 1645, the one or more position sensors 1640, or some combination thereof. For example, the tracking module 1660 determines a position of a reference point of the headset 1605 in a mapping of a local area based on information from the headset 1605. The tracking module 1660 may also determine positions of an object or virtual object. Additionally, in some embodiments, the tracking module 1660 may use portions of data indicating a position of the headset 1605 from the position sensor 1640 as well as representations of the local area from the DCA 1645 to predict a future location of the headset 1605. The tracking module 1660 provides the estimated or predicted future position of the headset 1605 or the I/O interface 1610 to the engine 1665.

The engine 1665 executes applications and receives position information, acceleration information, velocity information, predicted future positions, or some combination thereof, of the headset 1605 from the tracking module 1660. Based on the received information, the engine 1665 determines content to provide to the headset 1605 for presentation to the user. For example, if the received information indicates that the user has looked to the left, the engine 1665 generates content for the headset 1605 that mirrors the user's movement in a virtual local area or in a local area augmenting the local area with additional content. Additionally, the engine 1665 performs an action within an application executing on the console 1615 in response to an action request received from the I/O interface 1610 and provides feedback to the user that the action was performed. The provided feedback may be visual or audible feedback via the headset 1605 or haptic feedback via the I/O interface 1610.

The network 1620 couples the headset 1605 and/or the console 1615 to the mapping server 1625. The network 1620 may include any combination of local area and/or wide area networks using both wireless and/or wired communication systems. For example, the network 1620 may include the Internet, as well as mobile telephone networks. In one embodiment, the network 1620 uses standard communications technologies and/or protocols. Hence, the network 1620 may include links using technologies such as Ethernet, 802.11, worldwide interoperability for microwave access (WiMAX), 2G/3G/4G mobile communications protocols, digital subscriber line (DSL), asynchronous transfer mode (ATM), InfiniBand, PCI Express Advanced Switching, etc. Similarly, the networking protocols used on the network 1620 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 1620 can be represented using technologies and/or formats including image data in binary form (e.g. Portable Network Graphics (PNG)), hypertext markup language (HTML), extensible markup language (XML), etc. In addition, all or some of links can be encrypted using conventional encryption technologies such as secure sockets layer (SSL), transport layer security (TLS), virtual private networks (VPNs), Internet Protocol security (IPsec), etc.

The mapping server 1625 may include a database that stores a virtual model describing a plurality of spaces, wherein one location in the virtual model corresponds to a current configuration of a local area of the headset 1605. The mapping server 1625 receives, from the headset 1605 via the network 1620, information describing at least a portion of the local area and/or location information for the local area. The user may adjust privacy settings to allow or prevent the headset 1605 from transmitting information to the mapping server 1625. The mapping server 1625 determines, based on the received information and/or location information, a location in the virtual model that is associated with the local area of the headset 1605. The mapping server 1625 determines (e.g., retrieves) one or more acoustic parameters associated with the local area, based in part on the determined location in the virtual model and any acoustic parameters associated with the determined location. The mapping server 1625 may transmit the location of the local area and any values of acoustic parameters associated with the local area to the headset 1605.

One or more components of system 1600 may contain a privacy module that stores one or more privacy settings for user data elements. The user data elements describe the user or the headset 1605. For example, the user data elements may describe a physical characteristic of the user, an action performed by the user, a location of the user of the headset 1605, a location of the headset 1605, an HRTF for the user, etc. Privacy settings (or "access settings") for a user data element may be stored in any suitable manner, such as, for example, in association with the user data element, in an index on an authorization server, in another suitable manner, or any suitable combination thereof.

A privacy setting for a user data element specifies how the user data element (or particular information associated with the user data element) can be accessed, stored, or otherwise used (e.g., viewed, shared, modified, copied, executed, surfaced, or identified). In some embodiments, the privacy settings for a user data element may specify a "blocked list" of entities that may not access certain information associated with the user data element. The privacy settings associated with the user data element may specify any suitable granularity of permitted access or denial of access. For example, some entities may have permission to see that a specific user data element exists, some entities may have permission to view the content of the specific user data element, and some entities may have permission to modify the specific user data element. The privacy settings may allow the user to allow other entities to access or store user data elements for a finite period of time.

The privacy settings may allow a user to specify one or more geographic locations from which user data elements can be accessed. Access or denial of access to the user data elements may depend on the geographic location of an entity who is attempting to access the user data elements. For example, the user may allow access to a user data element and specify that the user data element is accessible to an entity only while the user is in a particular location. If the user leaves the particular location, the user data element may no longer be accessible to the entity. As another example, the user may specify that a user data element is accessible only to entities within a threshold distance from the user, such as another user of a headset within the same local area as the user. If the user subsequently changes location, the entity with access to the user data element may lose access, while a new group of entities may gain access as they come within the threshold distance of the user.

The system 1600 may include one or more authorization/privacy servers for enforcing privacy settings. A request from an entity for a particular user data element may identify the entity associated with the request and the user data element may be sent only to the entity if the authorization server determines that the entity is authorized to access the user data element based on the privacy settings associated with the user data element. If the requesting entity is not authorized to access the user data element, the authorization server may prevent the requested user data element from being retrieved or may prevent the requested user data element from being sent to the entity. Although this disclosure describes enforcing privacy settings in a particular manner, this disclosure contemplates enforcing privacy settings in any suitable manner.

ADDITIONAL CONFIGURATION INFORMATION

The foregoing description of the embodiments has been presented for illustration; it is not intended to be exhaustive or to limit the patent rights to the precise forms disclosed. Persons skilled in the relevant art can appreciate that many modifications and variations are possible considering the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. An optical device comprising:
   a two-dimensional (2D) diffractive optical element including structures with different periods in two orthogonal directions, wherein the 2D diffractive optical element is configured to use light to generate a plurality of one-dimensional (1D) light patterns parallel to a first direction, and the plurality of 1D light patterns are compressed in a second direction that is orthogonal to the first direction such that the plurality of 1D light patterns form an aggregate 1D pattern parallel to the first direction that has a zeroth diffraction order whose intensity value is below a target threshold.

2. The optical device of claim 1, wherein each of the plurality of 1D light patterns has a zeroth order whose respective intensity value is below the target threshold.

3. The optical device of claim 1, wherein the aggregate 1D pattern has a diffraction order greater than zero that has an intensity value below the target threshold.

4. The optical device of claim 1, wherein the plurality of 1D light patterns are compressed in the second direction such that at least a portion of a 1D light pattern overlaps with a portion of an adjacent 1D light pattern.

5. The optical device of claim 4, wherein the portion of the 1D light pattern and the portion of the adjacent 1D light pattern have a same diffraction order.

6. The optical device of claim 4, wherein the portion of the 1D light pattern that overlaps with the portion of the adjacent 1D light pattern is of a first diffraction order.

7. The optical device of claim 4, wherein an entirety of the 1D light pattern overlaps with an entirety of the adjacent 1D light pattern.

8. The optical device of claim 1, wherein the 1D light pattern and an adjacent 1D light pattern are separated by less than a 0.5 degree.

9. The optical device of claim 1, wherein the 1D light pattern and an adjacent 1D light pattern are separated by less than a 0.2 degree.

10. The optical device of claim 1, wherein a period of the structures of the 2D diffractive optical element in the second direction is at least 40 times larger than a period of the 2D diffractive optical element in the first direction.

11. The optical device of claim 1, further comprising an optical lens that compresses the plurality of 1D light patterns along the second direction to form the aggregate 1D light pattern.

12. The optical device of claim 1, wherein the optical device is part of a depth camera assembly.

13. A depth camera assembly (DCA) comprising:
a light source; and
a two-dimensional (2D) diffractive optical element including structures with different periods in two orthogonal directions, wherein the 2D diffractive optical element is configured to use light from the light source to generate a plurality of one-dimensional (1D) light patterns parallel to a first direction, and the plurality of 1D light patterns are compressed in a second direction that is orthogonal to the first direction such that the plurality of 1D light patterns form an aggregate 1D pattern parallel to the first direction that has a zeroth diffraction order whose intensity value is below a target threshold.

14. The DCA of claim 13, wherein each of the plurality of 1D light patterns has a zeroth order whose respective intensity value is below the target threshold.

15. The DCA of claim 13, wherein the aggregate 1D pattern has a diffraction order greater than zero that has an intensity value below the target threshold.

16. The DCA of claim 13, wherein the plurality of 1D light patterns are compressed in the second direction such that at least a portion of a 1D light pattern overlaps with a portion of an adjacent 1D light pattern.

17. The DCA of claim 16, wherein the portion of the 1D light pattern and the portion of the adjacent 1D light pattern have same diffraction order.

18. The DCA of claim 16, wherein the portion of the 1D light pattern that overlaps with the portion of the adjacent 1D light pattern is of a first diffraction order.

19. The DCA of claim 16, wherein an entirety of the 1D light pattern overlaps with an entirety of the adjacent 1D light pattern.

20. The DCA of claim 13, further comprising an optical lens that compresses the plurality of 1D light patterns along the second direction to form the aggregate 1D light pattern.

* * * * *